FIG. I

INVENTORS.
DERALD HENRY KRAFT &
RONALD H. D. ARMBRUSTER
BY
Tilberry & Body
ATTORNEYS INVENTORS.
DERALD HENRY KRAFT &
RONALD H. D. ARMBRUSTER
BY
Tilberry & Body
ATTORNEYS Nov. 8, 1966 D. H. KRAFT ET AL 3,283,551

AUTOMATIC FEED MECHANISM FOR A PRESS

Filed Nov. 29, 1963 11 Sheets-Sheet 3

INVENTORS.
DERALD HENRY KRAFT &
RONALD H. D. ARMBRUSTER
BY
Tilberry & Body
ATTORNEYS Nov. 8, 1966 D. H. KRAFT ET AL 3,283,551

AUTOMATIC FEED MECHANISM FOR A PRESS

Filed Nov. 29, 1963 11 Sheets-Sheet 4

INVENTORS.
DERALD HENRY KRAFT &
RONALD H. D. ARMBRUSTER
BY
Tilberry & Body
ATTORNEYS INVENTORS.
DERALD HENRY KRAFT &
RONALD H. D. ARMBRUSTER
BY
Tilberry & Body
ATTORNEYS Nov. 8, 1966 D. H. KRAFT ETAL 3,283,551

AUTOMATIC FEED MECHANISM FOR A PRESS

Filed Nov. 29, 1963 11 Sheets-Sheet 6

INVENTORS.
DERALD HENRY KRAFT &
RONALD H. D. ARMBRUSTER
BY
Tilberry & Body
ATTORNEYS

AUTOMATIC FEED MECHANISM FOR A PRESS

INVENTORS.
DERALD HENRY KRAFT &
RONALD H. D. ARMBRUSTER
BY
Tilberry & Body
ATTORNEYS Nov. 8, 1966 D. H. KRAFT ET AL 3,283,551

AUTOMATIC FEED MECHANISM FOR A PRESS

Filed Nov. 29, 1963 11 Sheets-Sheet 8

INVENTORS.
DERALD HENRY KRAFT &
RONALD H. D. ARMBRUSTER
BY
Tilberry & Body
ATTORNEYS

AUTOMATIC FEED MECHANISM FOR A PRESS

Filed Nov. 29, 1963 11 Sheets-Sheet 9

INVENTORS.
DERALD HENRY KRAFT &
RONALD H. D. ARMBRUSTER
BY
Tilberry & Body
ATTORNEYS

AUTOMATIC FEED MECHANISM FOR A PRESS

Filed Nov. 29, 1963 11 Sheets-Sheet 10

INVENTORS.
DERALD HENRY KRAFT &
RONALD H. D. ARMBRUSTER
BY
Tilberry & Body
ATTORNEYS

AUTOMATIC FEED MECHANISM FOR A PRESS

Filed Nov. 29, 1963 11 Sheets-Sheet 11

INVENTORS.
DERALD HENRY KRAFT &
RONALD H. D. ARMBRUSTER
BY Tilberry & Body
ATTORNEYS United States Patent Office 3,283,551
Patented Nov. 8, 1966

3,283,551
AUTOMATIC FEED MECHANISM FOR A PRESS

Derald Henry Kraft, Hastings, and Ronald Herman David Armbruster, Battle Creek, Mich., assignors to E. W. Bliss Company, Hastings, Mich., a corporation of Michigan Filed Nov. 29, 1963, Ser. No. 326,874
13 Claims. (Cl. 72—4)

This invention is related to the art of presses and more particularly to an automatic feed mechanism for a press.

The invention is particularly adapted for use with coining presses and will be described with particular reference thereto, although it will be appreciated that the invention may be used in conjunction with various types of presses in which automatic feeding is desirable.

One feeding mechanism known in the prior art adapted for coining presses includes a disk rotatably mounted on a press die table. The disk includes an annular array of spaced openings therein for carrying coin blanks from a hopper feed point, or the like, to the die cavity in the die table where the disk momentarily stops while a vertically reciprocable upper die of the press is brought vertically downward to perform a coining operation on the blank in cooperation with a vertically aligned lower die. After the upper die begins its upward movement from the die cavity, the disk is angularly displaced so that the coined blank may be positioned at an ejection station and ejected. Thus, the disk carries several blanks in a circular path intermittently stopping during which a coined blank is ejected at an ejection station, a blank to be coined is received at a hopper feeding station, and a blank is coined by the upper and lower dies at the die cavity or coining station.

Obviously, it is important to know whether a coin blank has been received by an opening in the disk prior to that opening stopping at the coining station. This knowledge is important not only for purposes of information that blanks are being fed to the coining station, but also for the protection of the coining dies. Coining dies are expensive and for mint purposes must be extremely accurate. Hence, if a blank is not present in the die cavity during the coining operation, the faces of the upper and lower dies will come into contact and be damaged. For this reason it has been somewhat conventional in a dial feed mechanism as described to provide a detecting station between the coin feeding and coining stations, including means to detect the presence or absence of a blank. If a blank is absent, suitable means responsive to the detection means operate to stop the operation of the press and thereby protect the press dies.

Several shortcomings are presented by a feeding mechanism of the disk type referred to above. Notable among these shortcomings is that in operation difficulties arise in accurately timing the intermittent angular rotation of the disk and positioning of the several openings carrying coin blanks with respect to the coining operation portion of the press cycle of the dies. If the timing and, or the positioning is inaccurate, a coin blank at the coining station may be other than coaxially aligned with the upper and lower dies, whereby the dies will strike the disk rather than the blank, causing damage to the dies and, or providing an inferior coined blank.

Another notable shortcoming of the disk type feeding mechanism is that excess metal obtained from the blanks during the coining operation frequently gathers between the die table and the disk, and in such a location it is difficult to remove the excess metal by cleaning processes without disassembling the disk from the die table.

A still further shortcoming of such a disk type feeding mechanism lies in the lack of means for positively securing the coin blanks in the die cavity. That is, means are not provided for insuring that the coin blanks when at the coining station are aligned so as to be in a plane substantially perpendicular with the axis defined by the upper and lower dies. Without such means it will be appreciated that conceivably a blank may be tilted to the extent that it defines a plane parallel to the axis of the dies. In such case a unique appearing coin might be produced, while of importance to coin collectors is an undesirable product as viewed by mint authorities.

Further, such a disk type feeding mechanism is located close to the die cavity area, rendering it somewhat difficult to install and maintain appropriate blank detection means.

The present invention relates to an improved feeding mechanism for presses which overcomes the above-mentioned shortcomings, as well as other shortcomings present in prior art mechanisms.

The invention contemplates a feed mechanism for a press having first and second coaxeally aligned dies and a prime mover for imparting reciprocal coaxial movement to the first die relative to the second die in repeating press cycles, with each cycle including die working and die retracting positions of the first die; the feed mechanism including a slide finger mechanism adapted to be slidably mounted on the press for reciprocal movement along a path transversely of the axis defined by the coaxially aligned dies; suitable power takeoff means connecting the prime mover and the slide finger mechanism in such a relationship for imparting reciprocal movement to the slide finger mechanism along the transverse path between extended and retracted positions respectfully corresponding with the retracted and working positions of the first die; the slide finger mechanism further including workpiece receiving and dispensing means for receiving a workpiece when in the retracted position and dispensing a workpiece on the second die when in the extended position.

In accordance with one aspect of the invention, the improved feed mechanism includes a workpiece head maintaining means for maintaining a head of workpieces to be fed to the workpiece receiving and dispensing means.

In accordance with a still further aspect of the present invention, the improved feed mechanism includes workpiece sensing means for sensing whether a workpiece is received by the receiving and dispensing means and being operative to develop output signals in accordance therewith, and press control circuit means responsive to the output signals for stopping press operation upon the absence of a workpiece in the receiving and dispensing means.

In still a further aspect of the invention, proximity detector or sensor means are provided for sensing the presence of absence of workpieces in the slide finger mechanism prior to their being placed on the second die. Further, a similar proximity sensing means is provided for sensing whether a finished workpiece has been properly ejected from the press by the slide finger mechanism. Circuit means are connected to the proximity sensors responsive to output signals developed by the sensors and operative to shut the press down when the sensors indicate that a workpiece has not been properly ejected, or is not being fed to the die cavity by the slide finger mechanism.

It is a principal object of the invention to provide an automatic feed mechanism for a press which obviates the disadvantages of the aforesaid heretofore employed expediences.

Other objects of the invention include the provision of a novel slide finger mechanism which is fully automatic in operation in timed relationship to the press cycle to feed a workpiece to the die cavity while at the same time ejecting a finished workpiece therefrom; the provision of a novel die displacement means which is automatic in operation in timed relationship to the press cycle to displace the second die toward the first die so as to place a finished workpiece in the travel path of the slide finger mechanism, whereby the workpiece is ejected from the press; the provision of a novel lost motion device for purposes of causing the slide finger mechanism to dwell or rest for an adjustable period during the press cycle during which the dies perform their work operation; the provision of a novel workpiece injection means mounted to the slide finger mechanism for purposes of positively placing workpieces into the die cavity on the die face of the second die so that the workpiece lies in a plane substantially perpendicular to the axis defined by the dies; the provision of proximity sensor means for sensing the presence or absence of workpieces being fed by the slide finger mechanism to the die cavity and connected with circuit means for stopping the press operation upon sensing the absence of workpieces; the provision of proximity ejection sensor means for sensing the presence or absence of finished workpieces being ejected from the press and connected with circuit means for stopping the press operation upon sensing the absence of a properly ejected workpiece; the provision of a workpiece hopper, feed tracks and feeding tubes for maintaining a head of workpieces to be fed to the slide finger mechanism; the provision of workpiece minimum head sensing means for sensing whether a predetermined minimum head of workpieces is being maintained and connected with circuit means to stop further operation of the press upon sensing that such a head is not being maintained; and the provision of workpiece maximum head sensing means for sensing whether the head of workpieces in the feed tubes is above a predetermined maximum and connected to circuit means for stopping further build up of the head of workpieces.

The foregoing and other objects and advantages of the invention will become apparent from the following description used to illustrate the preferred embodiment of the invention, as read in connection with the accompanying drawings in which.

*Press general arrangement*

Figure 1:
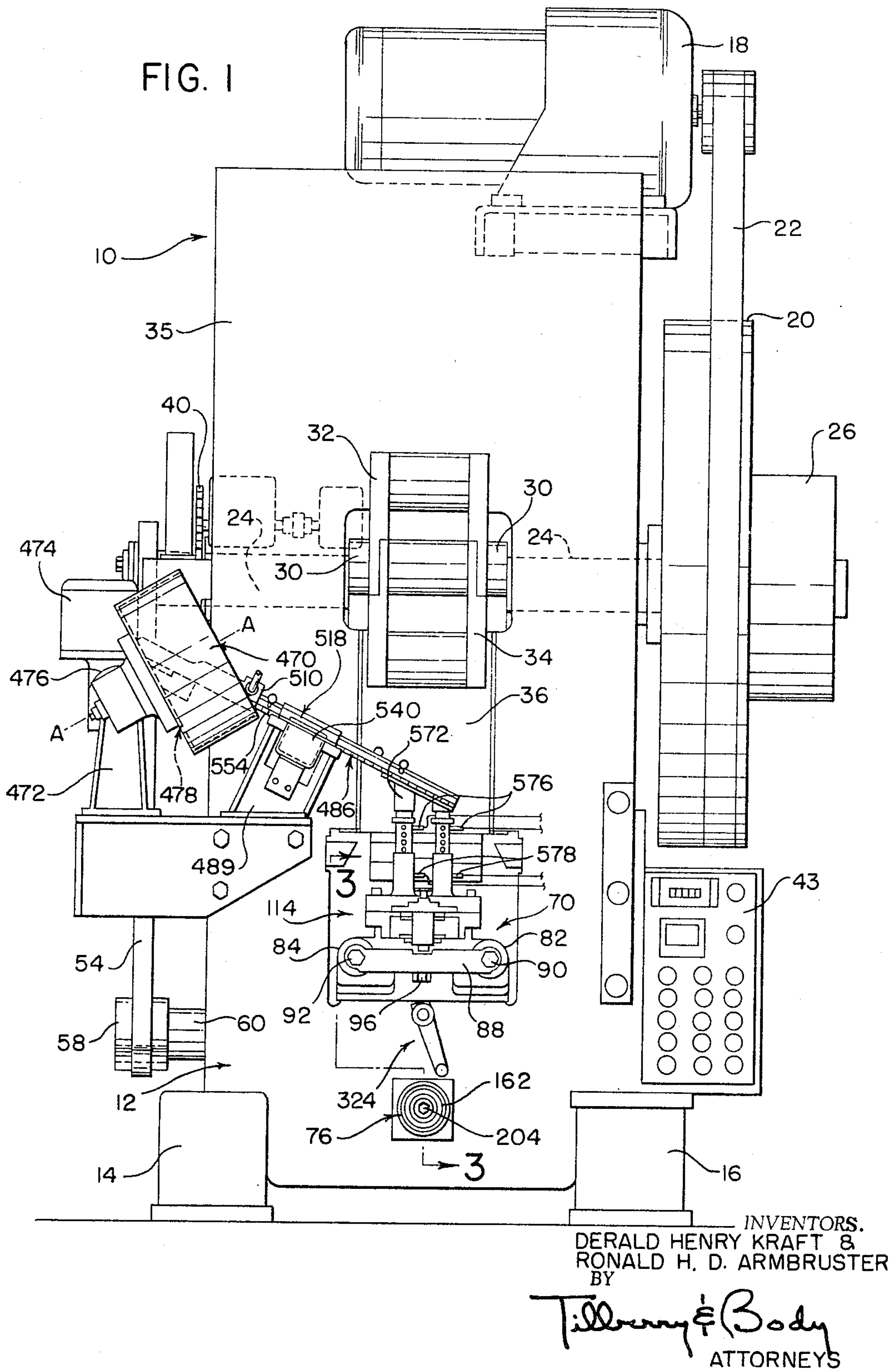
FIGURE 1 is a schematic front elevational view of a knuckle joint press incorporating the novel feed mechanism.
Figure 2:
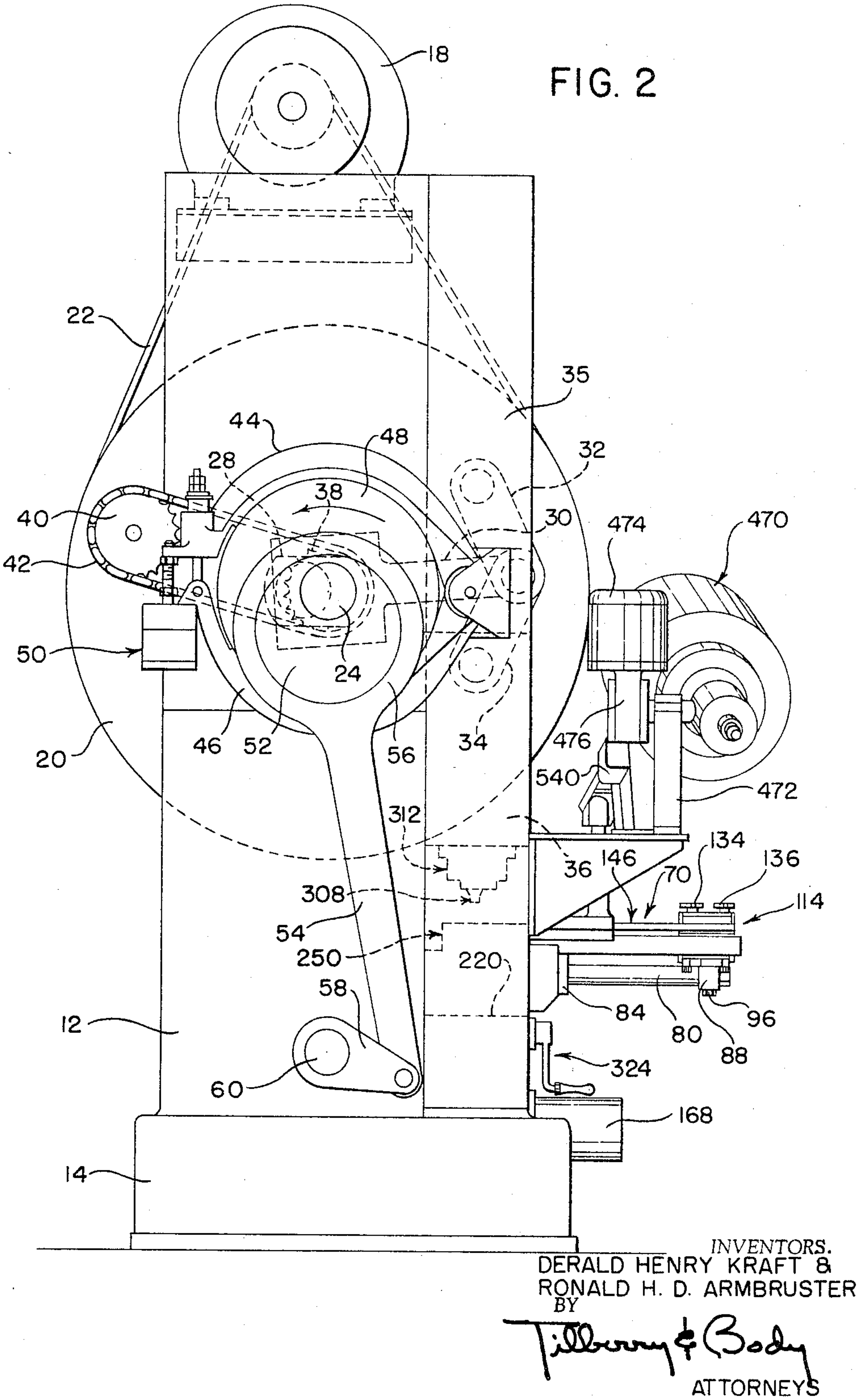
FIGURE 2 is a left end elevational view of the press shown in FIGURE 1.

Referring now to the drawings and more particularly to FIGURES 1 and 2, there is shown a knuckle joint type press 10 constructed of a one piece oval frame 12 completely fabricated from solid, thick, rolled steel plate and supported by legs 14 and 16 suitably bolted in place to a mounting floor. Preferably, the frame 12 is supported by the legs 14 and 16 so that the frame is completely independent of the legs, which rules out any malfunction that hypothetically might be brought about by faulty installations or vibrations resulting from inadequate foundations. Thus, legs 14 and 16 serve to simply support frame 12 which operates independently of the legs insofar as any stress, vibration or deflection are concerned. A press drive motor 18 is suitably mounted on the top of frame 12 and serves to provide rotational forces to a fly wheel 20 via drive belt 22. Fly wheel 20 in turn is drivingly connected to one end of a crankshaft 24 for driving same in conjunction with a suitable clutch and brake mechanism 26 suitably secured to the fly wheel 20. Crankshaft 24 includes an intermediate or throw portion 28 between its ends to which is connected one end of a connecting rod 30. The other end of connecting rod 30 is pivotally connected to adjacent ends of a pair of knuckle joint links 32 and 34, as is shown in FIGURE 2. The other end of link 32 is pivotally connected to the crown 35 of the press and the other end of link 34 is pivotally connected to a slide 36 slidably secured to frame 12 for vertical reciprocal movement. The other end of crankshaft 24 has a ratchet wheel 38 secured thereto for rotational movement therewith for purposes of driving another ratchet wheel 40 via a suitable drive belt 42. Ratchet wheel 40 is rotatably mounted to frame 12 and serves to rotate cam limit switches and the like used for various press operations in timed relationship to the press cycle in conjunction with an operator's control console 43 secured to one side of the press frame 12. Further, for emergency stopping purposes the press is provided with an auxiliary braking mechanism including a pair of brake shoes 44 and 46 coaxially surrounding a disk 48 secured to the crankshaft 24. The brake shoes 44 and 46 are actuable by means of a remotely controlled solenoid mechanism 50.

An eccentric disk 52 is secured in eccentric fashion to the left end of crankshaft 24, as viewed in FIGURE 1. A power take off arm 54 is slidably secured to the eccentric disk 52 by virtue of an annular ring 56 at one end of the arm, coaxially mounted to disk 52 and suitably secured thereto in a manner to prevent axial displacement therefrom, but permit angular, slidable motion therebetween. The other end of arm 54 is pivotally connected to one end of a bell crank arm 58, which is secured to a pivot shaft 60 pivotally mounted to the press frame 12. In this manner, as crankshaft 24 is rotated about its axis in the direction of the arrow in FIGURE 2, bell crank arm 58 will reciprocably pivot between positions A and B (as is seen by the dotted lines in FIGURE 3) respectively corresponding to the coining position of slide 36 (dotted lines in FIGURE 3) and the retracted position of slide 36 (shown by solid lines in FIGURE 3).

*General arrangement of slide finger and lower die lift up mechanisms*

Figure 3:
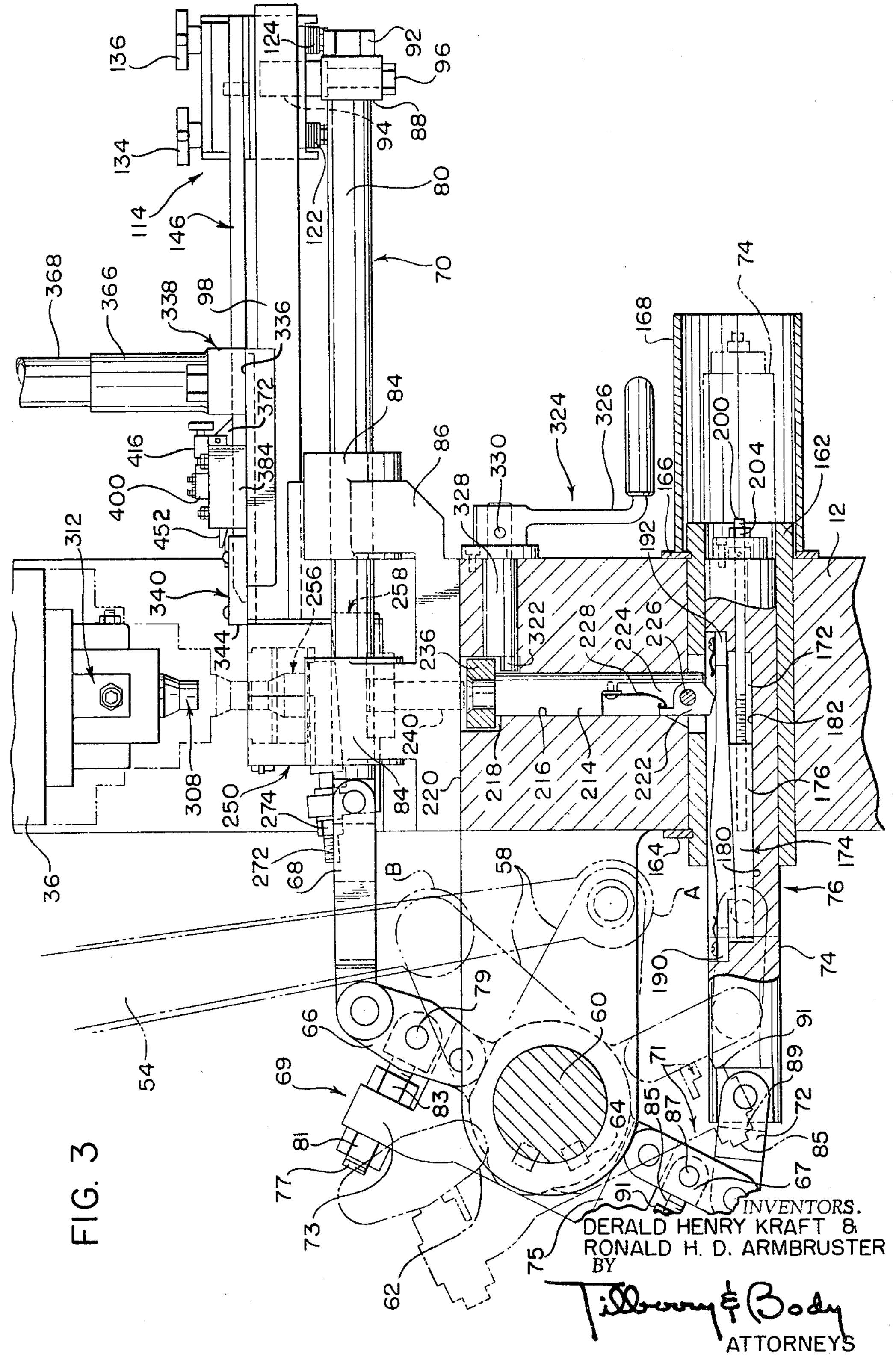
FIGURE 3 is an enlarged fragmentary view partly in section taken on line 3—3 of FIGURE 1 illustrating the feeding mechanism including a slide finger mechanism and a lift out mechanism according to the present invention with the upper dies of the press fully retracted.

Referring now to FIGURE 3, there is shown a rocker arm support 62 mounted to shaft 60 and keyed thereto by means of a key and slot arrangement 64, so as to pivot with shaft 60 as bell crank arm 58 is reciprocally displaced between positions A and B. A pair or rocker arm links 66 and 67 are each pivotally mounted at one end of rocker arm support 62 and extend from the rocker arm support in diametrically opposing directions with respect to shaft 60. Thus, as bell crank arm 58 pivots from position A to position B, links 66 and 67 are displaced from the position shown by the solid lines in FIGURE 3, to the position shown by the dotted lines in FIGURE 3.

The links 66 and 67 may be pivotally adjusted relative to rocker arm support 62 by means of a pair of micro-adjustment assemblies 69 and 71, respectively. Adjustment assemblies 69 and 71 respectively, include oppositely directed flanges 73 and 75 depending from support 62. A threaded bolt 77 extends through flange 73 and is pivotally secured at one end to a midportion of link 66 as by a pivot post 79 extending transversely through the mid-portion. Once the desired pivotal adjustment of link 66 has been attained a pair of spaced nuts 81 and 83 threaded on bolt 77 are tightened against opposite sides of flange 73 to lock the pivotal adjustment of link 66. Similarly, a threaded bolt 85 extends through flange 75 and is pivotally secured at one end to a midportion of link 67, as by a pivot post 87 extending transversely through the mid-portion. Once the desired pivotal adjustment of link 67 has been attained a pair of spaced nuts 89 and 91 threaded on bolt 85 are tightened against opposite sides of flange 75 to lock the pivotal adjustment of link 67.

A coupling 68 is pivotally connected at one end to link 66 and at the other end to a slide finger mechanism 70 for purposes of transmitting and converting the reciprocal pivotal movement of bell crank arm 58 to reciprocal horizontal movement of the slide finger mechanism. Similarly, a coupling 72 is pivotally connected at one end to link 67 and at the other end to a plunger 74 of a lower die lift up mechanism 76 for purposes of transmitting and converting the reciprocal pivotal movement of link 68 to reciprocal horizontal movement of plunger 74.

*Lower die lift up mechanism*

Figure 11:
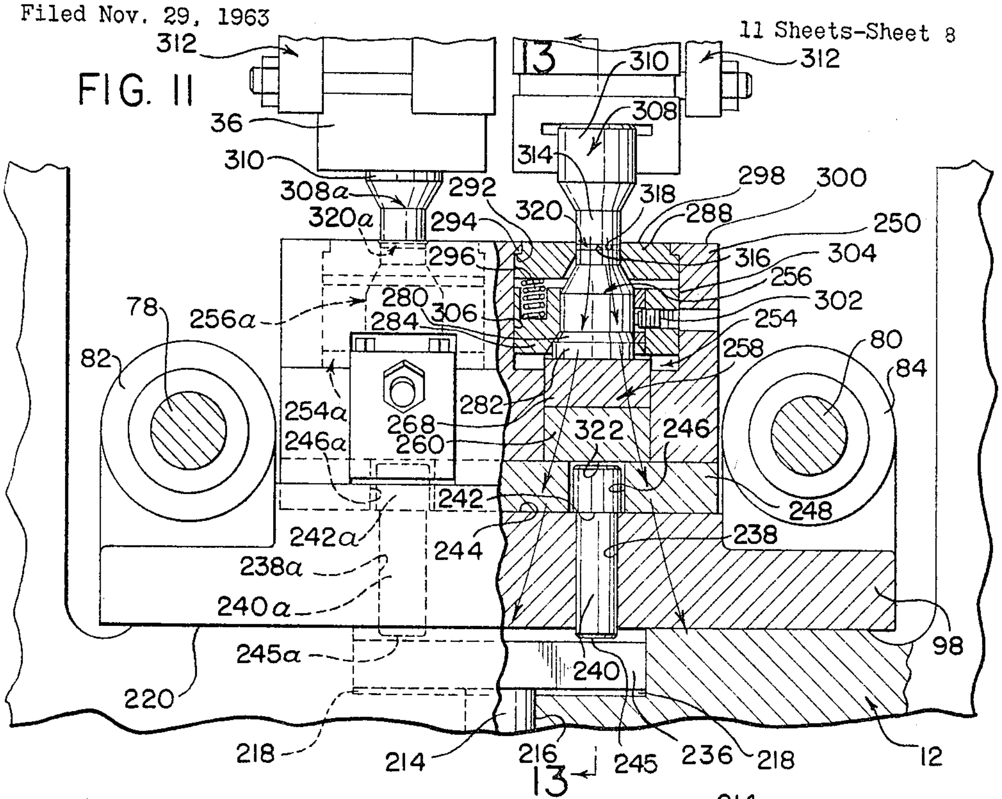
FIGURE 11 is a sectional view taken along line 11—11 of FIGURE 4 with the upper dies of the press in their coining positions.
Figure 12:
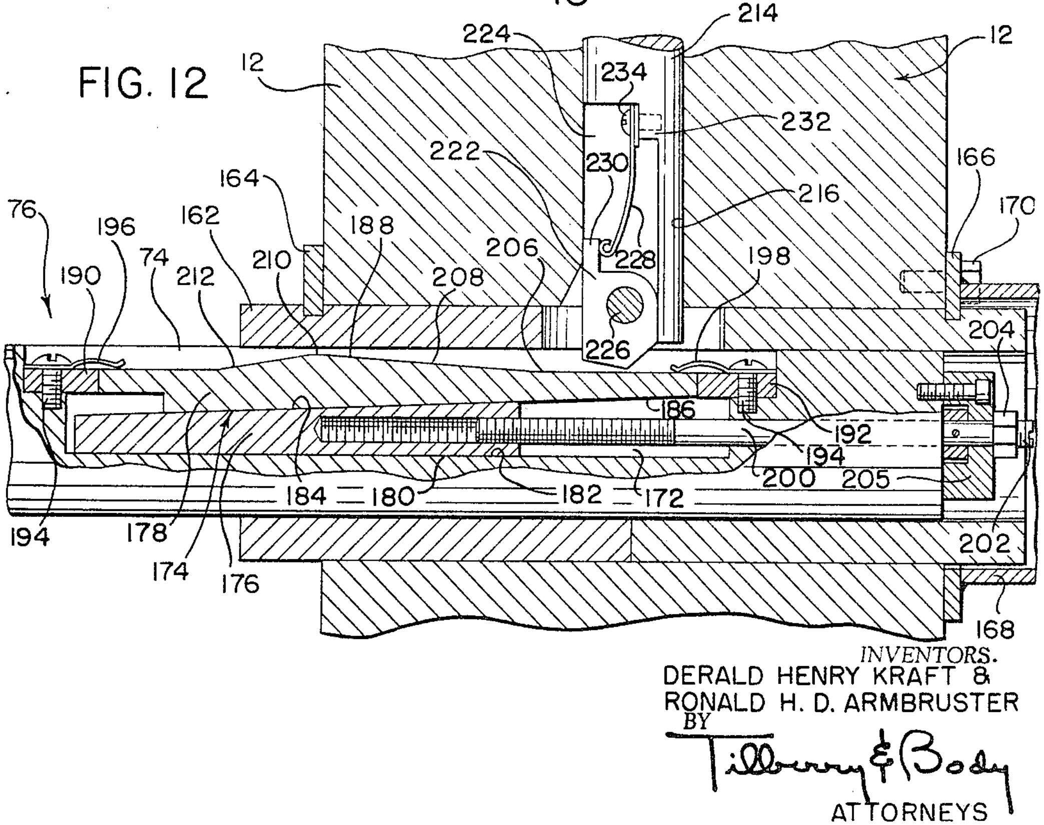
FIGURE 12 is an elongated view shown partly in section of the lift up mechanism illustrated in FIGURE 3.

The lower die lift up mechanism 76 is shown in detail in FIGURES 11 and 12 and includes a cylindrical sleeve 162 which slidably receives plunger 74 and extends horizontally through press frame 12. Sleeve 162 is secured to frame 12 by means of a key plate and slot arrangements 164 and 166 at opposite ends of the sleeve. Key plate arrangement 166 is also secured to frame 12 by means of a bolt 170. A protective cylindrical sleeve 168 is suitably mounted to key plate arrangement 166, by welding, so as to coaxially surround sleeve 162 and provide an extension thereof, as shown in FIGURE 3. In this manner, as plunger 74 is reciprocally displaced between the positions shown by the solid lines and dotted lines in FIGURE 3, respectively corresponding with positions A and B of pivot arm 58, no damage will result to the plunger by virtue of obstructing exterior objects and the like.

Plunger 74 is provided with a cavity 172 intermediate its ends which opens in a direction facing upwardly, as is shown in FIGURES 3 and 12. Cavity 172 serves to house an adjustable wedge block 174 comprising a wedge 176 and a cam block 178.

Wedge 176 includes a flat surface 180 in frictional, slidable movement with a corresponding flat surface 182 of plunger 74 at the bottom of cavity 172. The opposite surface 184 of wedge block 176 is tapered relative to surface 180 and frictionally engages a similarly tapered surface 186 on the bottom side of cam block 178. The opposing, or top side, of cam block 178 is provided with a cam surface 188. Cam block 178 is prevented from axial displacement relative to plunger 74 by means of blocks 190 and 192 abutting opposite ends of cam block 178 and secured to the plunger as by bolts 194. Cam block 178 is also resiliently held in place on wedge block tapered surface 184 by means of spring clips 196 and 198 respectively secured at one end to blocks 190 and 192 by means of bolts 194. The other ends of spring clips 196 and 198 are in resilient engagement with the top or cam surface 188 of cam block 178 providing a downwardly directed bias force, as viewed in FIGURE 12, so as to resiliently maintain cam block 178 in place on wedge block 176.

A threaded shaft 200 is threaded axially through plunger 74 into the cavity 172 and is threaded to wedge block 176. The other end of shaft 200 protrudes axially outward from one end of plunger 74 and includes a transverse slot 202. A screwdriver, or the like, may be inserted into slot 202 to rotate shaft 200 and thereby slidably displace wedge block 176 axially of plunger 74 causing a corresponding vertical adjustment of cam block 178. This adjustment may be required due to slight inaccuracies present in lift up mechanism 76, as well as cam wear of cam surface 188 with extended use. A lock nut 204 is threaded to the end of shaft 200 in tight engagement with a stop block 205 mounted to the end of plunger 74 for purposes of axially locking the shaft to prevent accidental axial displacement of wedge block 176.

Cam surface 188 includes from right to left, as viewed in FIGURE 12, a horizontal portion 206 merging into an inclined portion 208 followed by a relatively short horizontal or flat portion 210 elevated relative to portion 206 and a drop off portion 212. A lift up shaft 214 is reciprocally received and guided by a passage 216 extending vertically upward through sleeve 162, press frame 12 and terminating in a recess 218 in bed surface 220 of frame 12, as is shown in FIGURES 3 and 11. A dog 222 is pivotally mounted to the bottom end of lift up shaft 214 at a cut away portion 224 of the shaft by means of a pivot post 226 secured to the shaft. A spring 228 is interposed between an upwardly extending flange portion 230 of dog 222 and a shoulder 232 of the shaft 214 in the cut away portion 224. A suitable bolt 234 secures one end of spring 228 to the shoulder 232. Spring 228 serves to resiliently bias flange portion 230 of dog 222 into frictional engagement with the walls of passage 216, extending through frame 12.

With this construction, as plunger 74 is displaced toward the right, as viewed in FIGURES 3 and 12 by virtue of bell crank arm 58 being displaced from position A to position B, dog 222 will ride up the inclined surface portion 208 of cam block 178, momentarily dwell or rest in vertical position as it is in engagement with the flat surface 210 of cam block 178 and thereafter ride down drop off portion 212 under the forces of gravity and return to the position shown in FIGURE 12. As plunger 74 is displaced to the left and returned to the position shown in FIGURE 12, by virtue of bell crank arm 58 traversing from position B to position A, dog 222 will pivot in a clockwise direction about pivot post 226, as viewed in FIGURE 12, when engaged by drop off portion 212 so as to thereby prevent lift up shaft 214 from being displaced vertically upward. The extent of upward vertical displacement of lift up shaft 214 is determined by the height of the flat surface portion 210 relative to the horizontal surface portion 206 of cam block 178. Adjustment of the extent of vertical displacement of lift up shaft 214 may be obtained by turning threaded shaft 200 with a screwdriver via slot 202 in the end of the shaft. In addition, the point in the press cycle that dog 222 begins to ride up inclined surface 208 may be changed by adjusting microadjustment assembly 71 as desired, see FIGURE 3.

A lift up plate 236 is received by recess 218 in the press bed surface 220 of frame 12, as shown in FIGURE 11, and is mounted to the top end of lift up shaft 214 so as to reciprocate in a vertical direction within recess 218 as shaft 214 vertically reciprocates within passage 216 in frame 12.

Figures 13, 14:
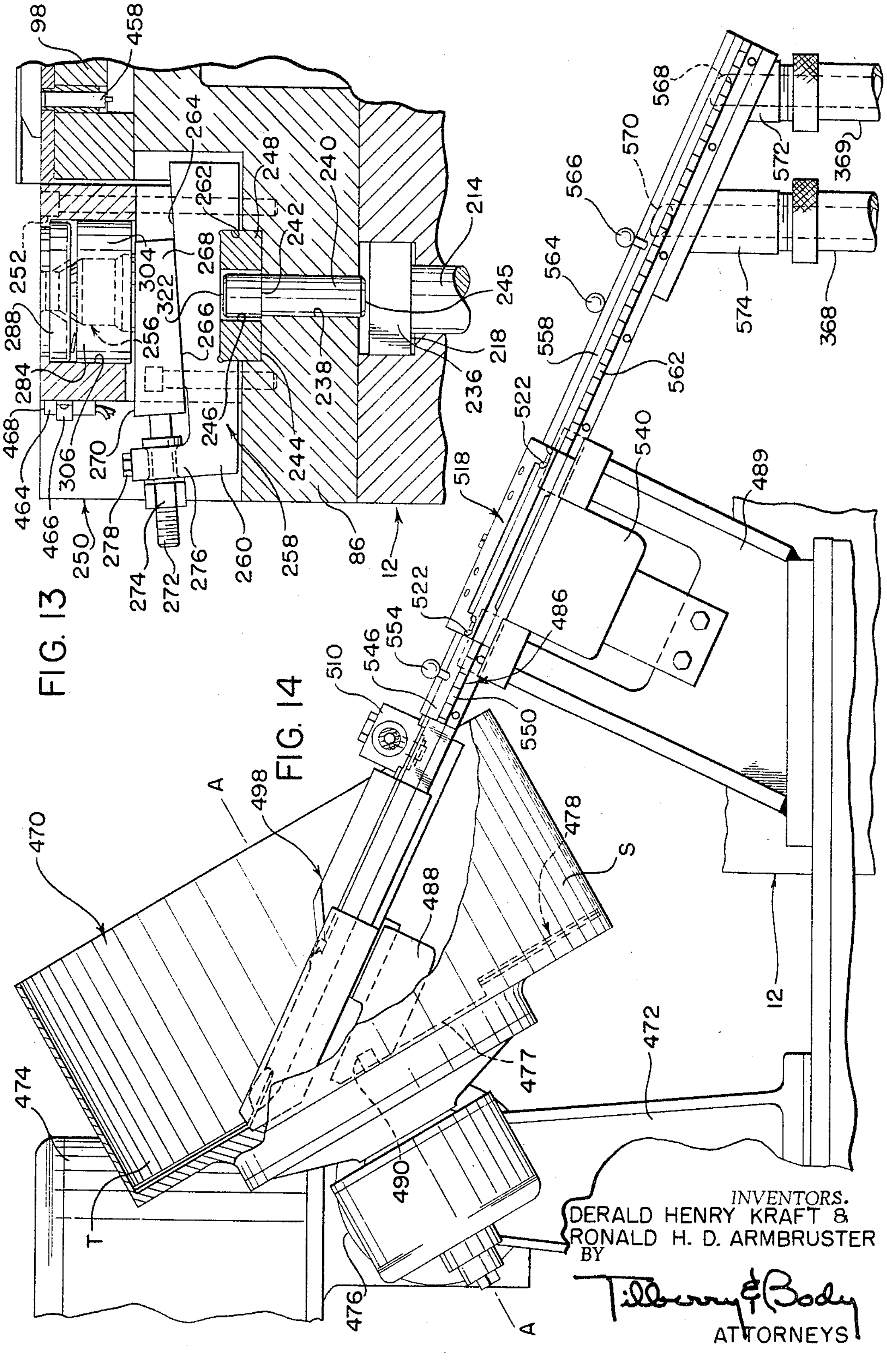
FIGURE 13 is a view partly in section of a portion of the lower die lift up mechanism illustrated in FIGURE 3 and taken along line 13—13 of FIGURE 11.
FIGURE 14 is a fragmentary enlarged front elevational view illustrating a coin hopper and the coin tracks of the invention as illustrated in FIGURE 1 with parts broken away.

Secured on the press bed surface 220 of press frame 12, there is provided a feed bed 98 having a pair of spaced identical passages 238 and 238*a* extending vertical therethrough. Passages 238 and 238*a* serve to receive and vertically guide substantially identical movable lower die lift up studs 240 and 240*a*, respectively, as shown in FIGURE 11. Studs 240 and 240*a* are provided with annular shoulders 242 and 242*a* at the top portions thereof, which are of greater diameter than passages 238 and 238*a*. With this construction shoulders 242 and 242*a* of studs 240 and 240*a*, respectively, may rest on a relatively flat recessed surface 244 in feed bed 98, as shown in FIGURE 13. A space 245 is defined between the bottom ends of the studs and lift up plate 236 when lift up shaft 214 is in its retracted position, as shown in FIGURE 12.

Annular shoulders 242 and 242*a* of lower die lift up studs 240 and 240*a*, respectively, extend above the top surface 244 of feed bed 98 into a pair of identical passages 246 and 246*a* extending vertically through a pilot block 248 seated on the recessed surface 244 of feed bed 98, as is shown in FIGURE 13.

A lower die block 250 is mounted on the top surface of feed bed 98 and is secured thereto as by a bolt 252, as shown in FIGURE 13. Die block 250 is provided with a pair of substantially identical die receiving cavities 254 and 254*a*, as shown in FIGURE 11, for respectively receiving and containing identical lower dies 256 and 256*a*. The contents of each die receiving cavity, including the dies 256 and 256*a*, are identical and therefore only those associated with die 256 will be described hereinafter in detail. Die receiving cavity 254 contains, in addition to lower die 256, an adjustable wedge mechanism 258 which supports die 256. The wedge mechanism 258 includes a lower wedge block 260 keyed to the pilot block 248 by means of a transverse slot 262 therein which receives the pilot block, as shown in FIGURE 13. Wedge block 260 includes an upper tapered surface 264 on which a corresponding tapered surface 266 of an upper wedge block 268 is in frictional engagement and whereby the top surface 270 of wedge block 268 defines a horizontal plane. Lower die 256 rests on the top surface 270 of wedge block 268 and may be initially vertically adjusted relative to die block 258 by means of a threaded bolt 272 mounted to one end of wedge block 268 and threaded through an annular nut 274. Nut 274 extends through an up-turned flange 276 extending from lower wedge block 260 in such a manner that the nut is secured against axial displacement, but is allowed to rotate about its longitudinal axis. By turning nut about its longitudinal axis wedge block 268 cams against wedge block 260, thereby varying the vertical position of lower die 256 relative to die block 250. A lock screw 278 is threaded through flange 276 and may be tightened against annular nut 274 to lock the adjustment of lower die 256 relative to die block 250.

Lower die 256 includes a tapered shoulder 280 tapering radially outward and merging into a cylindrical base portion 282, as shown in FIGURE 11. An annular alignment collar 284 coaxially surrounds lower die 256 and is provided with a tapered shoulder 286 which rests on tapered shoulder 280 of lower die 256. Collar 284 is secured to lower die 256 by means of a set screw 302 which is threaded radially through the collar so as to tightly engage lower die 256, as shown in FIGURE 11. As lower die 256 and collar 284 are axially displaced in a vertical direction in die receiving cavity 254, the outer annular surface 304 of collar 284 frictionally engages the annular side walls 306 of cavity 254 so as to guide the vertical movement of the die.

An annular ring 288 coaxially surrounds lower die 256 at its cylindrical neck portion 290, as is shown in FIGURE 11. Ring 288 serves as a guide for lower die 256 as it is vertically displaced along its longitudinal axis. Ring 288 is prevented from being ejected vertically upward from die receiving cavity 254 by means of an annular shoulder 292 thereof which mates with an overlapping annular shoulder 294 of die block 250. A coil compression spring 296 is interposed between annular ring 288 and collar 284 so as to resiliently bias lower die 256 in a vertically downward direction. Spring 296 also serves to resiliently bias annular ring 288 vertically upward into engagement with shoulder 294 of die block 250 whereby the upper or top surface 298 of annular ring 288 is horizontal and substantially flush with the top or upper surface 300 of die block 250.

Upper dies 308 and 308*a* are suitably secured at their cylindrical base portions 310 to slide 36 as by suitable die holding mechanisms 312 so as to be respectively coaxially aligned with lower dies 256 and 256*a*. Dies 308 and 308*a* are identical and, as shown in FIGURE 11, die 308 includes a cylindrical neck portion 314 having a diameter equal to that of the cylindrical neck portion 290 of lower die 256. Lower dies 256 and 256*a* are also identical and as shown in FIGURE 11, a die face 316 of suitable impression is provided on the end of neck portion 290 of lower die 256 and faces a die face 318 on the end of neck portion 314 of upper die 308. The die faces 316 of lower dies 256 and 256*a* are normally positioned slightly lower than the top or upper surface 300 of die block 250, and define together with the inner circumferences of rings 288 a pair of recesses or die cavities 320 and 320*a*. With this construction, a suitable coin blank 350 may be placed in each of the die cavities 320 and 320*a* whereupon as upper dies 308 and 308*a* are lowered to their coining positions, shown in FIGURE 11, the blanks 350 undergo severe coining pressures becoming finished coins.

The axial length of annular shoulder 242 of lift up stud 240 is such that as it rests on the recessed surface 244 in feed bed 98, a space 322 is defined between the top end of stud 240 and the bottom surface of lower wedge block 260 as is shown in FIGURE 11. With this arrangement of parts, upon upper dies 308 and 308*a* being lowered to their coining positions, shown in FIGURE 11, the downwardly directed coining pressure forces transmitted by the upper dies to the lower dies pass downwardly through wedge blocks 268 and 260, through pilot blocks 248, and thereafter through feed bed 98 to the press frame 12, as is shown by the arrows in FIGURE 11. In this manner, no coining pressure forces are transmitted to the lift up mechanisms 76 via lift up stud 240 or lift up shaft 214, thereby preventing damage to the lift up mechanism.

Lower die lift up mechanism 76 also includes a hand crank mechanism 324, shown in FIGURE 3, for purposes of enabling an operator to manually apply forces to lift lower dies 256 and 256*a* vertically upward so that, for example, the die faces 316 of lower dies 256 and 256*a* may be wiped clean with a cloth. Hand crank mechanism 324 includes an L-shaped handle 326 keyed, as by a pin 330, to one end of a cylindrical elongated shaft 328 extending horizontally through press frame 12, as shown in FIGURE 3. The other end of cylindrical shaft 328 has a portion cut away to form a cam 332 adapted to cam against the underside of lift up plate 236 as handle 326 is actuated to rotate shaft 328. With this construction, as cam 332 cams against the under side of lift up plate 236 to lift the plate vertically upward, the plate in turn engages and vertically lifts studs 240 and 240*a*. Studs 240 and 240*a* in turn engage identical adjustable wedge mechanisms 258 in die receiving cavities 254 and 254*a* to thereby vertically lift lower dies 256 and 256*a* so that die faces 316 of the dies 256 and 256*a* are located in substantially the same plane as the flat surface 300 of die block 250. Upon the operator returning lift up crank handle 326 to the position, as shown in FIGURE 3, lift up studs 240 and 240*a* will return to the position shown in FIGURE 11 due to the forces of gravity. Lower dies 256 and 256*a* will be returned to the position shown in FIGURE 11 by means of the downwardly directed forces exerted on the dies by identical compression springs 296 in die receiving cavities 254 and 254*a*, respectively.

*Slide finger mechanism*

Figure 4:
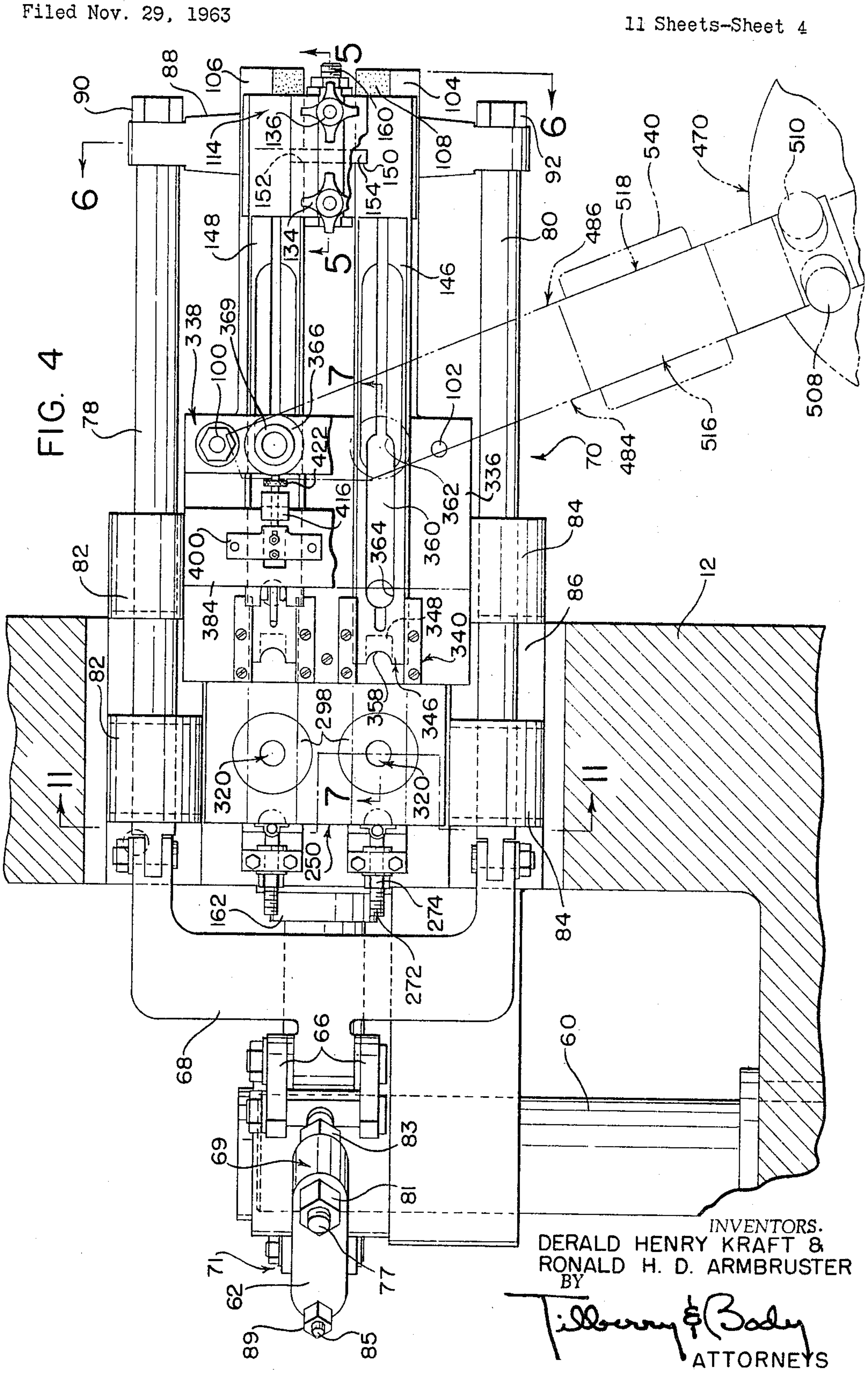
FIGURE 4 is a plan view of FIGURE 3 partly in section illustrating the slide finger mechanism.

Slide finger mechanism 70 includes a pair of coplanar parallelly aligned connecting rods 78 and 80, each pivotally connected at one end to a leg portion of coupling 68 which is U-shaped, as is shown in FIGURE 4. Connecting rods 78 and 80 are slidably received by annular guides 82 and 84 extending upwardly from a feed body 86, secured to the press frame 12. Guides 82 and 84 serve to slidably support rods 78 and 80 in a manner to guide the rode for reciprocal motion in a substantially horizontal plane due to the forces transmitted to the rods from bell crank 58 via coupling 68. Rods 78 and 80 are connected together at their respective other ends by means of a cross bar 88 which is secured to the rods in a manner to prevent axial displacement relative thereto, as by nuts 90 and 82 respectively threaded to the ends of rods 78 and 80. Midway between rods 78 and 80, a stud 94 extends vertically through and upward from cross bar 88 and is held in place by means of a nut 96 threaded to the bottom end of the stud, as is shown in FIGURES 5 and 6.

The slide finger feed bed 98 is mounted on feed body 86 and is provided with a pair of flat, parellel depending rails 104 and 106 which extend horizontally from the bed between connecting rods 78 and 80, as shown in FIGURE 4. Rails 104 and 106 are each provided with a pair of brake linings 108 and 110 suitably secured thereto as by set screws 112 so that brake linings 108 extend along the inwardly directed edges and flush with the top surfaces of rails for portions of their lengths adjacent their free ends, shown in FIGURES 5 and 6. Similarly, brake linings 110 are secured to rails 104 and 106 as by set screws 112 so that brake linings 110 extend along the inwardly directed edges and flush with the bottom surfaces of the rails for portions of their lengths adjacent their free ends, as shown in FIGURES 5 and 6.

Figures 5, 6:
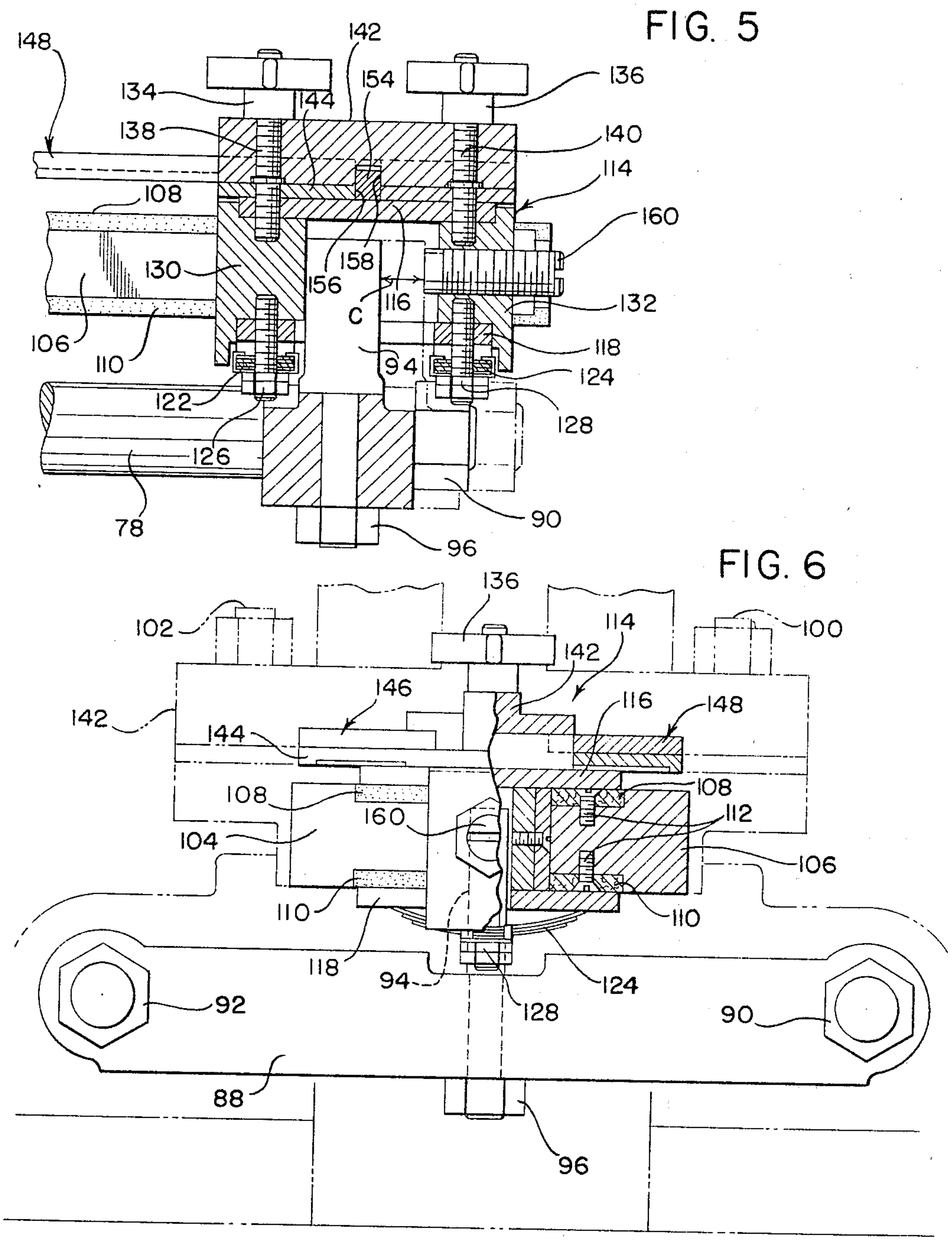
FIGURE 5 is an enlarged sectional view taken along line 5—5 of FIGURE 4.
FIGURE 6 is a fragmentary front elevational view partly in section taken along line 6—6 of FIGURE 4.

A lost motion device 114, shown in FIGURES 5 and 6, is slidably mounted on rails 104 and 106. Lost motion device 114 includes a top plate 116 in frictional engagement with brake linings 108, and a slotted bottom plate 118 in frictional engagement with brake linings 110. Plate 118 is resiliently maintained in frictional engagement with brake linings 110 by means of a pair of leaf springs 122 and 124 biased into engagement with plate 118 by means of nut and bolt assemblies 126 and 128 respectively threaded to longitudinally spaced block members 130 and 132, which mount top plate 116. Adjustment of leaf springs 122 and 124 is obtained by means of adjustment knobs 134 and 136 respectively threaded to the ends of a pair of bolts 138 and 140. Bolts 138 and 140 extend through a cover plate 142, an intermediate plate 144 and top plate 116 and are respectively threaded to blocks 130 and 132.

A pair of slide fingers 146 and 148 are received between cover plate 142 and intermediate plate 44, as shown in FIGURE 6. Slide fingers 146 and 148 are respectively provided with transversely aligned notches 150 and 152, as is shown in FIGURE 4, for purposes of receiving a key 154 extending through aligned transverse slots 156 and 158 in intermediate plate 144 and cover plate 142, respectively. With this construction, horizontal reciprocal movement of lost motion device 114 is transmitted to the slide feed fingers 146 and 148.

As will become more apparent from the description which follows, it is desirable that the slide feed fingers 146 and 148 dwell or stop for a period of the press cycle during which the coining operation takes place, i.e., when bell crank 58 is in position A, as shown in FIGURE 3. As bell crank 58 pivots between position B and position A, stud 94 is in the position shown by the dotted lines in FIGURE 5, and bears against one end of a dwell adjustment screw 160 threaded through block 132. However, as bell crank 58 reverses its direction of motion and travels from position A toward position B, stud 94 must first travel the distance C from the end of dwell adjustment screw 160 before engaging block 130 so as to move slide feed fingers 146 and 148 toward the left, as viewed in FIGURE 5. The dwell period, i.e., the period of a press cycle for stud 94 to travel from the end of dwell adjustment screw 160 a distance C so as to engage block 130 may be varied by adjusting screw 160. Preferably, screw 160 is adjusted so that distance C corresponds with a dwell period equal to 40° of a press cycle.

The coin blank feeding mechanisms associated with slide fingers 146 and 148 are identical and, accordingly, the description which follows will be directed toward the details of the mechanism associated with slide finger 146. It is to be understood that the description applies equally to an identical mechanism associated with slide finger 148.

Referring now to FIGURES 7, 8, 9 and 10, the coin feeding mechanism associated with slide finger 146 is illustrated in detail. Slide finger 146 is in reciprocal sliding engagement with the top surface 336 of a horizontal plate 334 mounted on top of feed bed 98. The flat surface 336 of plate 334 lies in a horizontal plane including the flat surfaces 298 and 300 of ring 228 and die block 250, respectively. With this construction, feed finger 146 is horizontally guided from its retracted position to its extended position, as is respectively shown by the solid lines in FIGURES 7 and 9.

Figure 10:
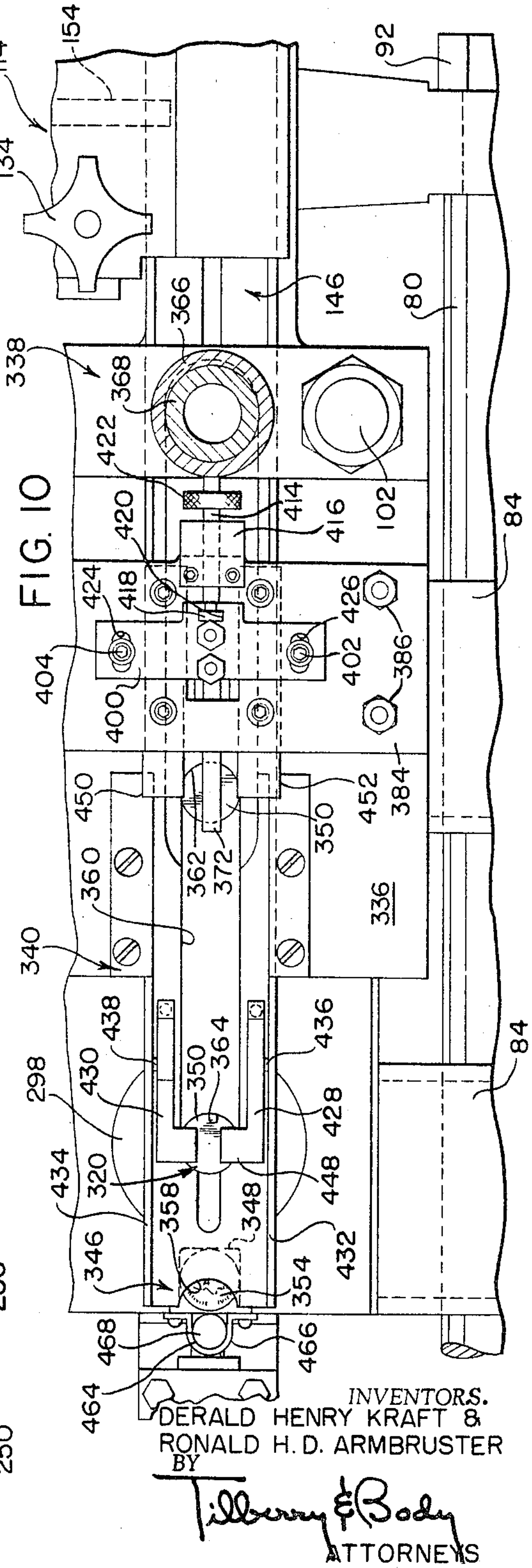
FIGURE 10 is a top plan view of the slide finger as shown in FIGURE 9.

A hold down housing 338 is mounted on plate 334 as by nut and bolt assemblies 100 and 102, as shown in FIGURES 4 and 10. Hold down housing 338 is provided with a longitudinally extending recessed portion 340 in its bottom surface through which slide finger 146 extends. A pair of slide guides 342 and 344 are provided within the recessed portion 340 and extend longitudinally therethrough for purposes of longitudinally guiding slide finger 146 as it reciprocates back and forth through housing 338.

Figures 7, 8:
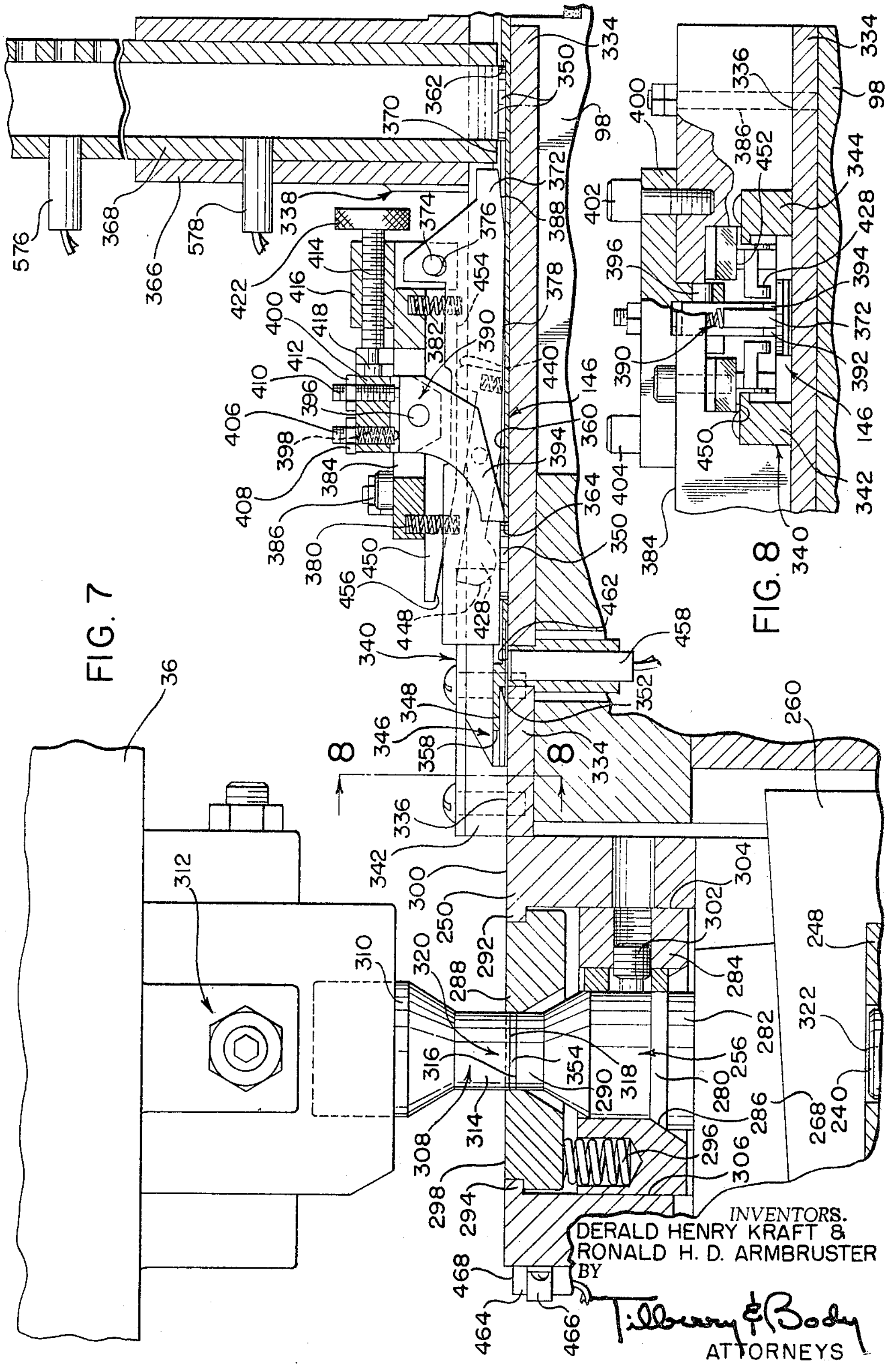
FIGURE 7 is a view partly in section taken along line 7—7 in FIGURE 4, illustrating a slide finger according to the invention in its retracted position and with the upper dies of the press in their down or coining position.
FIGURE 8 is a sectional view taken along line 8—8 of FIGURE 7.
Figure 9:
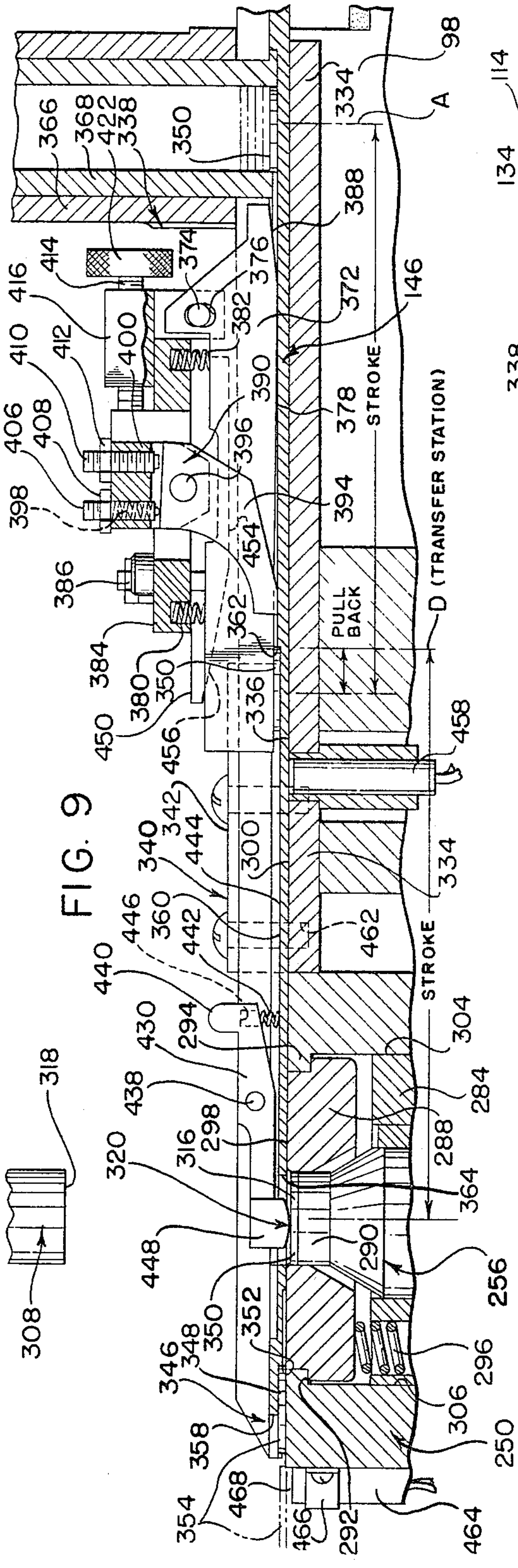
FIGURE 9 is a view similar to that of FIGURE 7, but illustrating the slide finger in the coin ejected position.

The slide finger 146 includes an ejector portion 346 at its nose or forward end. Ejection portion 346 takes the form of a recess 348 in the bottom surface of finger 146 extending for a portion of the length adjacent the forward end of the finger, as shown in FIGURE 7. The extent or height of the recess 348 is preferably sufficient that a coin blank 350 may be contained by the recess between the flat surface 336 of horizontal plate 334 and finger 146. Further, the recess 348 defines a shoulder 352 which serves to engage a coin 354 located on die face 316 of lower die 256 of the end of die block 250, as shown in FIGURE 9, and as will be described in greater detail hereinafter. Further, the ejection portion 346 of slide finger 146 is provided with an arcuate recess 358 in its forward or nose end, shown in FIGURE 10, so as to provide die clearance.

Intermediate the ends of slide finger 146 there is provided a longitudinal extending recess 360 in the top surface thereof, which terminates at its rearward end, i.e., in the opposite direction from ejector portion 346, in an arcuate shoulder 362 extending vertically upward from the bottom of the recess, as shown in FIGURES 4 and 7. At the forward end of recess 360, i.e., the end adjacent ejection portion 346, there is provided a coin blank aperture 364 extending vertically through the slide finger 146 and which serves to receive a coin blank 350, as is shown in FIGURE 7.

Mounted to and extending vertically upward from hold down housing 338, there is provided a cylindrical sleeve 366 containing a coin feed tube 368. Coin feed tube 368 is positioned directly over slide finger 146 and serves to feed coin blanks 350 into the rearward end of the recess 360 and slightly forward of shoulder 362 when finger 146 is in its retracted position, as illustrated in FIGURE 7. Slide finger 146 slidably reciprocates on plate 334 between its fully retracted position and its fully extended position respectively shown by the solid lines in FIGURES 7 and 9, just below the bottom end 370 of coin feed tube 368. Shoulder 362 at the rearward end of recess 360 of slide finger 146 serves to engage a coin blank 350 on its forward stroke and displace the blank in the direction of the die cavity 320.

A coin hold down shoe 372 is pivotally and vertically shiftably secured to hold down housing 338 by means of a stud 374 extending through an elongated vertical slot 376 in shoe 372, as illustrated in FIGURE 9. Hold down shoe 372 extends longitudinally through the center line of recessed portion 340 of hold down housing 338, as shown in FIGURE 8. Hold down shoe 372 includes a relatively flat bottom surface 378 which is maintained in resilient frictional engagement with slide finger 146 by means of a pair of compression spring coils 380 and 382 interposed between the top portion of the shoe 372 and a hold down cover plate 384, suitably secured to the top of bed plate 334 as by a nut and bolt assembly 386. With this construction, as slide finger 146 is displaced from its retracted position, as shown in FIGURE 7, to its fully extended position, as shown in FIGURE 9, a coin blank 350 is displaced from position A to position B, as viewed in FIGURE 9, by means of shoulder 362 at the rearward end of recess 360 of finger 146. During the transfer of a coin blank 350 from position A to position B, the blank cams against a cam surface 388 of shoe 372 and is thereafter in frictional sliding engagement with the bottom surface 378 of the shoe. The shoe 372 is maintained in resilient engagement with finger 146 and coin blanks 350 due to downwardly directed forces exerted by springs 380 and 382, thereby preventing any disengagement of the blanks from the slide finger 146 as it travels from position A to position B.

A coin blank stop finger 390 having a pair of depending downwardly extending legs 392, 394 is pivotally mounted to hold down cover plate 384 by means of a pivot post 396. Stop finger 390 is resiliently biased in a counterclockwise direction about pivot post 396, as viewed in FIGURES 7 and 9, by means of a compression coil spring 398 adjustably mounted in a stop finger block 400. Stop finger block 400 is mounted on hold down cover plate 384 as by bolts 402 and 404, shown in FIGURE 10. The bias force exerted by coil spring 398 on stop finger 390 may be adjusted by means of a threaded bolt 406 threaded to stop finger block 400 and engaging one end of coil spring 398, as shown in FIGURE 9. After the correct adjustment has been made, bolt 406 may be locked in place to block 400 by means of a nut 408 threaded to the end of bolt 406. Counterclockwise pivotal movement of stop finger 390, as viewed in FIGURE 9, is limited by a limit stop bolt 410 threaded through block 400, shown in FIGURE 9, and locked in place by means of a nut 412 tightly threaded on the end of bolt 410 against block 400.

A further adjustment of the resilient force exerted by spring 398 on stop finger 390 is made by means of a threaded shaft 414 threaded through a block 416 secured to hold down cover plate 384. Shaft 414 extends longitudinally of slide finger 146 and at its forward end, i.e., relative to ejection portion 346 of slide finger 146, includes a flanged portion 418 received in a corresponding slot 420 in stop finger block 400, as shown in FIGURE 10. An adjustment knob 422 is secured to the other end of shaft 414 for rotating the shaft whereupon the applied rotational forces are converted by the threading of shaft 414 and block 416 into axially directed forces so as to displace stop finger block 400 in a direction longitudinally of slide finger 146. The extent of longitudinal displacement of stop finger block 400 is determined by the extent of a pair of longitudinally extending slots 424 and 426 extending vertically through block 400 and respectively serving to receive bolts 402 and 404. Preferably, in assembly bolts 402 and 404 are tightened only sufficiently to secure block 400 in place on hold down cover plate 384 so as to permit fine adjustment by adjustment knob 422. Thereafter bolts 402 and 404 may be tightened against block 400 to lock the adjustment of knob 422.

With this construction, stop finger 390 is resiliently biased in a manner that its legs 392 and 394 are in frictional engagement with slide finger 146. As slide finger 146 is retracted from its fully extended position, as shown in FIGURE 9, to its fully retracted position, as shown in FIGURE 7, the ends of legs 292 and 294 of stop finger 390 engage a coin blank 350 seated in the rearward area of recess 360 of slide finger 146 so as to retain the coin blank at a transfer station position D, as illustrated in FIGURE 9. Thus, when slide finger 146 reaches its fully retracted position, coin blank 350 which has remained stationary at the transfer station position D relative to feed bed 98 and is located in the coin blank receiving aperture 364 of slide finger 146.

Slide finger 146 is provided with a pair of identical transversely aligned coin injection fingers 428 and 430 pivotally mounted to a pair of upwardly extending longitudinally aligned side flanges 432 and 434 of slide finger 146, as by pivot posts 436 and 438, respectively. Injection fingers 428 and 430 each includes at one end a vertically upward extending cam 440 and a compression coil spring 442 mounted at one end on flat surface 444 on the upper side of slide finger 146 and at the other end within a recess 446 of finger 430 directly below upwardly extending cam 440. The other end of injection finger 430 is provided with a downwardly extending pawl 448. Pawl 448 and pivot post 438 of injection finger 430 are arranged relative to slide finger 146 so that when the finger is in its fully extended position, as shown in FIGURE 9, pawl 448 is located in the die cavity 320 directly over the center line of lower die 256. Also when the slide finger 146 is in its fully extended position, coil spring 442 biases injection finger 430 in a counterclockwise direction about pivot post 438, as viewed in FIGURE 9, whereby pawl 448 resiliently forces a coin blank into die cavity 320 and positively places the blank in flat relationship on die face 316 of lower die 256.

As shown in FIGURES 7, 8 and 9, recessed portion 340 of hold down housing 338 includes a pair of longitudinally extending injection finger releasing bars 450 and 452. Injection finger releasing bars 450 and 452 are identical and, as shown in FIGURE 7, releasing bar 450 includes a horizontally extending lower surface 454 which merges into an upwardly extending tapered surface 456 in its forwardly directing end. With this construction, when slide finger 146 is in its fully retracted position, as shown in FIGURE 7, upwardly extending cam 440 of injection finger 430 is in engagement with lower surface 454 of releasing bar 450, with spring 442 compressed, maintaining pawl 448 out of engagement with a coin blank 350 in slide finger 146. As slide finger 146 extends from its retracted position, as shown in FIGURE 7, toward its fully extended position, as shown in FIGURE 9, cam 440 of injection finger 430 rides up the upwardly tapered surface 456 of releasing bar 450, whereby pawl 448 resiliently engages coin blank 350, urging it in the downward direction. Thus, when the slide finger 146 reaches its fully extended position, cam 440 is completely released from tapered surface 456 and injection finger 430 pivots in the counterclockwise direction, as viewed in FIGURE 9, whereby pawl 448 resiliently forces coin blank 350 downwardly to rest flush on die face 316 of lower die 256. In this manner, blank 350 is maintained in die cavity 320 in a horizontal plane, preventing the production of inaccurate coins.

Each of the slide fingers 146 and 148 has associated therewith a pair of proximity sensors which serve to sense the presence or absence of a coin blank. Although various forms of sensors may be used, such as photocells, preferably they take the form of conventional magnetic field balanced sensors, i.e., an output signal is developed when a magnetic object enters the magnetic field of the sensor so as to unbalance the field.

Referring now to FIGURES 7 and 9, a no coin proximity sensor 458 is mounted to the feed bed 98 and extends vertically upward therethrough and through the horizontal plate 334 on top of bed 98 in a manner to sense the presence or absence of coin blanks directly over its top end 462 and develop an output signal in accordance therewith. A second proximity sensor 464 is also associated with slide finger 146 and is mounted to the forward end of die block 250 as by a strap 466 so as to extend vertically upward. Proximity sensor 464 serves to sense the presence of a coin 354 (a coined blank 350) ejected from the forward end of die block 250 by means of the ejection portion 364 of slide finger 146 as the coin travels over the top end 468 of the sensor 464 and develops an output signal in accordance therewith.

*Hopper, feed tracks and feed tubes*

Figures 15, 16, 17, 18:
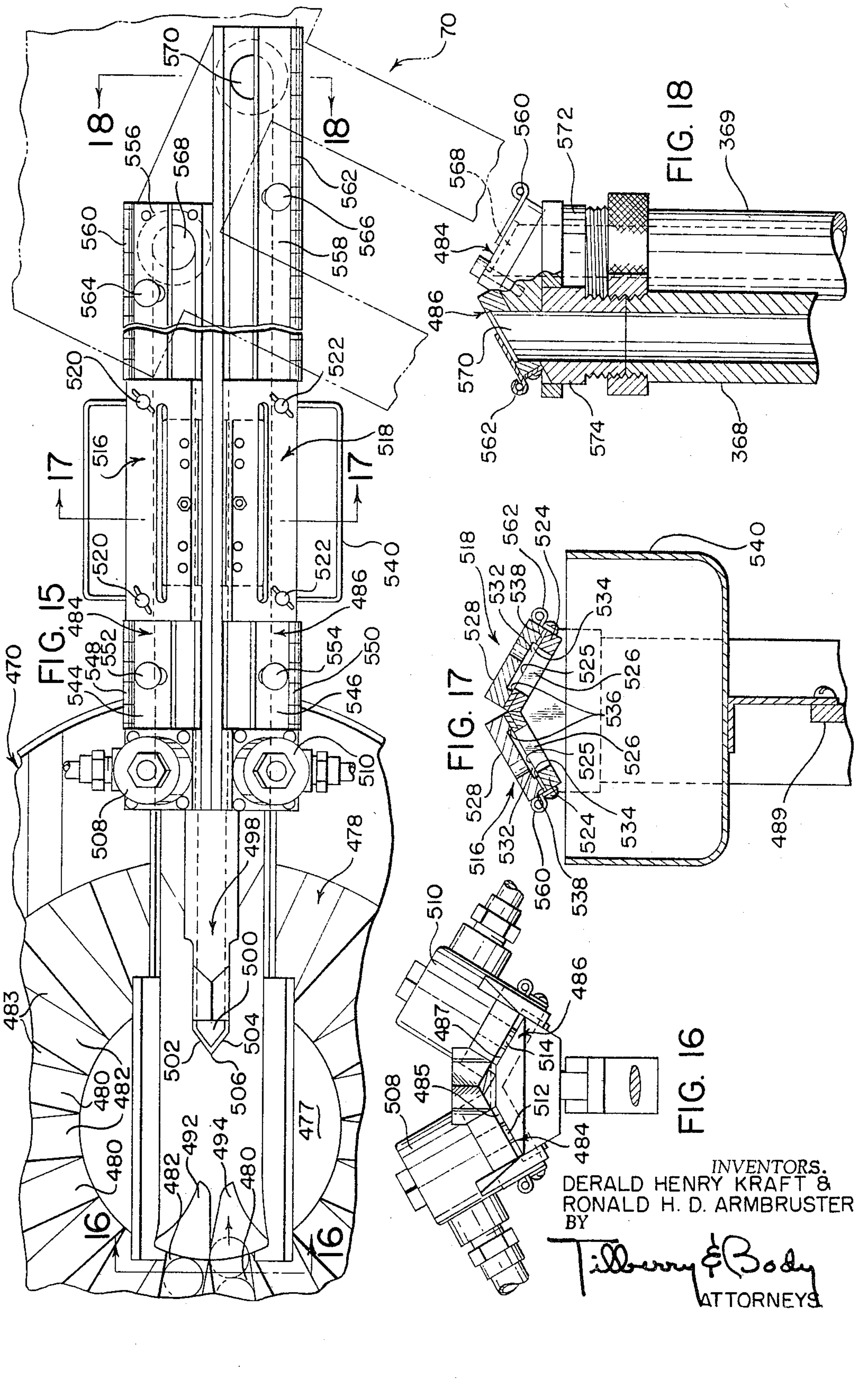
FIGURE 15 is a fragmentary plan view of the hopper and coin feed tracks illustrated in FIGURE 14.
FIGURE 16 is an end elevation view taken along line 16—16 of FIGURE 15 illustrating a pair of solenoid gate devices.
FIGURE 17 is a sectional view taken along line 17—17 of FIGURE 15, illustrating the cross section of a pair of coin gauge blocks.
FIGURE 18 is a sectional view taken along line 18—18 of FIGURE 15, illustrating a pair of coin feed tubes.

Referring now to FIGURES 14 through 18, there is illustrated a coin blank hopper, a pair of coin blank feed tracks and a pair of coin blank feed tubes. A coin blank hopper 470, which takes the form of a rotatable cylindrical cup open at the top, is mounted to the press frame 12 via a support leg 472 in a manner that the axis of rotation A—A of the hopper is inclined at approximately 30°, as illustrated in FIGURE 14. A hopper motor 474 is also mounted on the support leg 472, and through a suitable gear train housed within a gear box 476 serves to rotate the hopper 470 about its axis of rotation A—A. An annular coin blank sorter 478 is mounted on the floor 477 of hopper 470 and, as best shown in FIGURE 15, comprises a plurality of alternately high and low coin blank guide surfaces 480 and 482, respectively, which extend radially of the axis of rotation A—A of hopper 470. Intermediate adjacent guide surfaces 480 and 482 there is provided a coin blank retaining surface 483 which is of greater height than either surface 480 or 482 with respect to the hopper floor 477. With this construction, as hopper 470 rotates about its axis of rotation A—A with a plurality of coin blanks contained therein, the blanks will group and rest on high and low surfaces 480 and 482 and be held in place due to the height of retaining surface 483 as the hopper rotates the blanks from position S to position T, as viewed in FIGURE 14. When the blanks approach position T they slide downwardly under the forces of gravity along surfaces 480 and 482 and are respectively received by a pair of coin blank feed tracks 484 and 486.

Feed tracks 484 and 486 are substantially identical and are mounted on a support 485 secured to frame 12 so as to extend through the top, or open, end of hopper 470 at an angle of approximately 30°. One end of each of the tracks 484 and 486 is positioned adjacent the inner circumference of annular coin blank sorter 478 and at a point above the center of floor 477 of the hopper 470, as shown in FIGURE 14. The tracks 484 and 486 are maintained in this relationship to hopper 470 by means of a leg bracket 488 mounted to the underside of the tracks and receiving a stud 490 protruding from the center of floor 477.

The end of track 484 which is adjacent sorter 478 is provided with a guide flange 492 directed toward the other end of track 482 and is in frictional engagement with the inner circumference of sorter 478 at a height with respect to the floor 477 of hopper 470 equal to that of the height of low surfaces 482 of sorter 478. Similarly, the end of track 486 which is in engagement with the inner circumference of sorter 478 includes a coin blank guide flange 494 directed toward the other end of track 486 and is in frictional engagement with the inner circumference of sorter 478 at a height with respect to floor 477 of hopper 470 equal to that of high surfaces 480 of sorter 478.

Coin blank tracks 484 and 486 are secured together in side by side relationship in a manner that they are inclined downwardly from each other from their adjacent sides at an angle of approximately 30°, as shown in FIGURES 16, 17 and 18. With this construction, once the coin blanks have entered tracks 484 and 486 they will remain in their respective tracks throughout their travel to the other ends of the tracks. To further insure separation of the coin blanks, a separator 498 is mounted on the tracks along a portion of the line of contact of the adjacent sides of the tracks. Separator 498 includes a nose portion 500 having tapered surfaces 502 and 504 extending from a knife edge 506 toward the bottom ends of the tracks 484 and 486, as shown in FIGURE 15, so as to guide the coin blanks into the respective tracks.

A pair of solenoid gates 508 and 510 are transversely mounted on tracks 484 and 486, respectively. Solenoid gates 508 and 510 are conventional electro-magnetic solenoids and respectively include solenoid armatures or plungers 512 and 514 which upon energization of the respective solenoids extend downwardly into tracks 484 and 486 and rest on track floors 485 and 487 respectively, as shown in FIGURE 16, for purposes of preventing coin blanks from being passed by the tracks 484 and 486 beyond the solenoid gates.

A pair of coin blank gauge blocks 516 and 518 are spaced longitudinally from the solenoid gates and are respectively mounted on tracks 484 and 486 transversely of the longitudinal axis of the tracks. Gauge blocks 516 and 518 may be easily removed from tracks 484 and 486 by means of wing nut bolt asemblies 520 and 522, respectively, so as to replace the gauge blocks with similar gauge blocks for purposes of gauging coin blanks of different sizes. The gauge blocks 516 and 518 are substantially identical and, as shown in FIGURE 17, each comprises a lower plate 524 having a top flat surface 525 which lies in a plane with track floor 485 or 487 of the associated track 484 or 486. Each lower plate is also provided with a longitudinally extending slot 526. An upper plate 528 is mounted on each lower plate 524 and is provided with a longitudinally extending recess 532 which is of a greater width than the slots 526, defining lower and upper longitudinally extending shoulders 534 and 536 on each lower plate 524. In addition, a spacing 538 is defined between plates 524 and 528 at their lower ends, as viewed in FIGURE 17, which spacing is chosen somewhat less than the depth of recess 532 in plate 528. Recess 532 in upper plate 528 is formed in a manner that a desired coin blank to be passed by the gauge must be of a thickness slightly less than the depth of the recess and of a diameter slightly less than the width of the recess. Accordingly, as coin blanks of the desired size travel downwardly along tracks 484 and 486 and enter gauge blocks 516 and 518, they pass through gauge blocks 516 and 518 via the longitudinally extending recesses 532, and are prevented from falling through slots 526 by virtue of the shoulders 534 and 536 of lower plate 524. However, if a coin blank is of a thickness substantially less than that of the depth of recess 532, it will slip through the spacing 538 between lower and upper plates 524 and 528 and fall into a coin blank receiving basket 540 mounted on support 489 directly under gauge blocks 516 and 518. Similarly, if a coin blank enters either of gauge blocks 516 or 518 and is of a diameter substantially less than the width of slots 526, the blank will not be supported by shoulders 534 and 536 of lower plate 524, but instead will fall through the slot 526 and be received by the basket 540.

Intermediate solenoid gates 508 and 510 and gauge blocks 516 and 518 there is provided a pair of doors 544 and 546 respectively hinged to tracks 484 and 486 as by hinges 548 and 550 respectively. A pair of door knobs 552 and 554 are secured to the doors 546 and 548, respectively, whereby the doors may be opened and pivoted on the tracks by means of hinges 548 and 550 so that an operator may recover coin blanks from the tracks during periods of jamming, i.e., when at least one coin blank is of a diameter or thickness too great to be received by gauge blocks 516 or 518, and thus blocks the entrance to that gauge block.

Another set of doors 556 and 558 similar to doors 544 and 546 are respectively mounted to the tracks 484 and 486 between gauge blocks 516 and 518 and the respective bottom ends of the tracks, as viewed in FIGURES 14 and 15. Doors 556 and 558 are pivotally mounted on the tracks 484 and 486 as by hinges 560 and 562. Knobs 564 and 566 are mounted on the doors 556 and 558 so that an operator may pivotally open the doors for purposes of inspecting the flow of coin blanks which have passed through the gauge blocks 516 and 518 or for other purposes, such as maintance and repair.

A pair of coin blank dispensing apertures 568 and 570 are respectively provided in coin blank feed tracks 484 and 486 adjacent their lowermost ends, as shown in FIGURES 14 and 15. A pair of annular sleeves 572 and 574 are mounted to the undersides of tracks 484 and 486 about apertures 568 and 570, respectively, and extend vertically downward from the tracks and are threaded at their bottom ends to vertically aligned substantially identical coin feed tubes 369 and 368, respectively. Coin feed tubes 368 and 369 are resectively asociated with slide fingers 146 and 148 in identical manner as described previously with respect to FIGURES 7, 8, 9 and 10.

Coin feed tubes 368 and 369 are provided with identical coin head sensing devices and, as shown in FIGURE 7, a coin head high sensor 576 and a coin head low sensor 578 extend radially through the cylindrical sleeve 366 and feed tube 368. Coin head high and coin head low sensors 576 and 578 are preferably identical in structure and operation to that of no coin and ejection sensors 458 and 464. Coin head low sensor 578 is arranged to extend radially inward through sleeve 366 and coin feed tube 368 at a predetermined position close to the bottom end of coin feed tube so as to sense for the presence or absence of coin blanks at that height and develop an output signal in accordance therewith. Coin head high sensor 576 also extends radially through sleeve 366 and feed tube 368, but at a predetermined position spaced vertical upward from sensor 578 and serves to sense the presence or absence of coin blanks at that higher level in the feed tube 368 and develop output signals in accordance therewith.

*Control circuit diagrams*

Figures 19, 20:
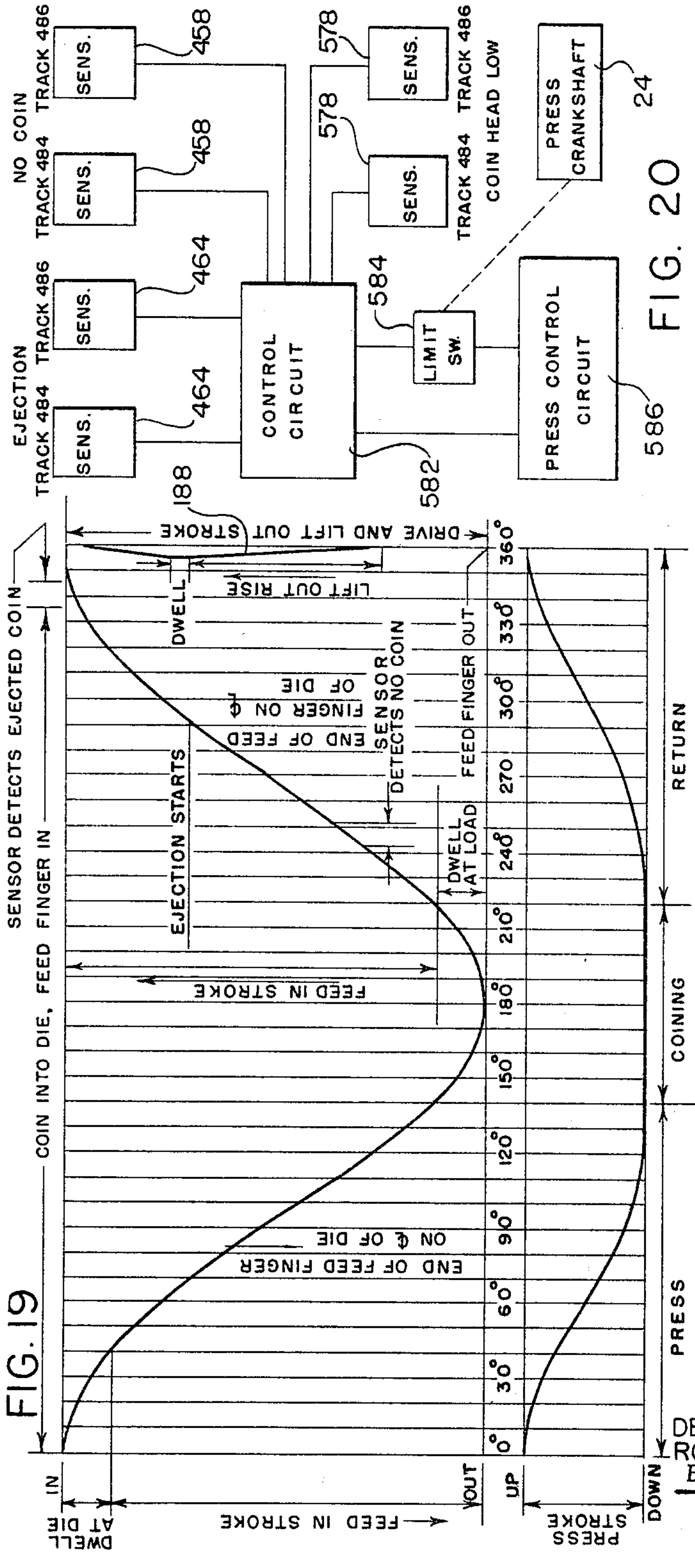
FIGURE 19 is a graph illustrating the stroke cycle of the press compared with the stroke cycle of the feed mechanism according to the invention.
FIGURE 20 is a block diagram of various electrical control devices in accordance with the invention.
Figure 22:
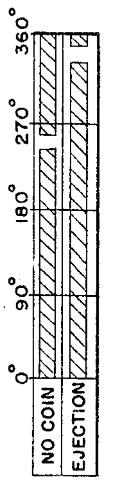
FIGURE 22 is a graphical illustration illustrating the closure and opening periods of the limit switch of FIGURE 20 in relationship to the press stroke cycle.
Figure 21:
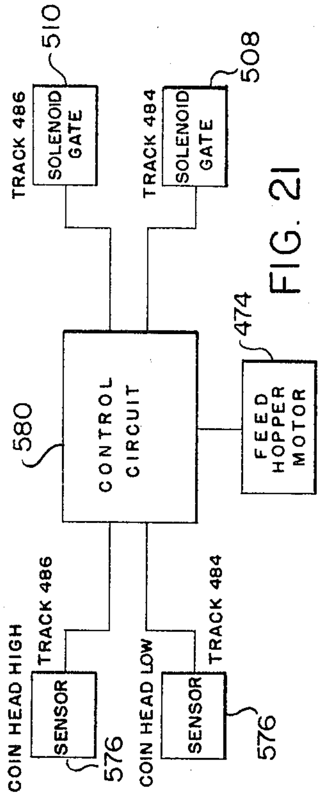
FIGURE 21 is a block diagram of various electrical control devices in accordance with the invention.

Referring now to FIGURES 20, 21 and 22, there is illustrated in block diagram form various electrical control devices, as well as a graphical illustration of the closure and opening periods of a cam limit switch in relationship to the press cycle. As is shown in FIGURE 21, a control circuit 580 is electrically connected with the coin head high sensor 576 associated with coin feed track 486 and with the coin head high sensor 576 associated with coin feed track 484. Further, the control circuit 580 is electrically connected with solenoid gate 510 associated with coin feed track 486, and with solenoid gate 508 associated with track 484. Still further, the control circuit 580 is electrically connected with the feed hopper motor 474. The control circuit 580 is operative in response to output signals developed by either of the sensors 576 of tracks 484 and 486 indicative of a coin head exceeding the desired maximum level to energize the appropriate solenoid gate 508 or 510 associated with the same track. Suitable time delay means are provided in the control circuit 580 to deenergize the solenoid gates after a predetermined time. However, if both coin head high sensors 576 indicate that the coin head is above the predetermined maximum level in both coin feed tubes 368 and 369 then the control circuit 580 is operative to deenergize the feed hopper motor 474.

In FIGURE 20 there is disclosed another control circuit 582, which is electrically connected to a pair of identical ejection sensors 464 respectively, associated with tracks 484 and 486. Control circuit 582 is also electrically connected to a pair of identical no coin sensors 458 respectively associated with tracks 484 and 486. Similary, a pair of identical coin head low sensors 578 respectively associated with coin feed tracks 484 and 486 are electrically connected to the control circuit 582. The press crankshaft 24 is mechanically connected to a cam limit switch mechanism 584, for rotation with the crankshaft. The cam limit switch mechanism 584 is electrically connected between the control circuit 582 and a press control circuit 586. The press control circuit 586 is also directly connected to the control circuit 582, as is shown in FIGURE 20. The cam limit switch mechanism 584 is rotated in timed relationship to the press crankshaft 24 in a manner to develop an output signal during each press cycle except for a short period extending from approximately 245° to 255° of a press cycle. Further, it will be observed that the limit switch mechanism 584 develops another output signal during each press cycle except for a short period from approximately 350° to just short of 360° of the press cycle.

Unless both of the no coin sensors 458 develop an output signal during the period from approximately 245° to 255° of the press cycle indicating the presence of a coin blank in each of the coin receiving apertures 364 in the slide fingers 146 and 148 respectively, then the press control circuit 586 will be operative to cause the press operation to stop, as by de-energizing drive motor 18 and energizing the solenoid auxiliary brake apparatus 50 and the brake portion of the combination of the brake and clutch 26. Similarly, if no output signal is received by control circuit 582 from either of the ejection sensors 464 indicative that a coin has been ejected from the end of die block 250 during a period of approximately 350° to 360° of the press cycle, then the press control circuit 586 will be operative to shut the press down in the manner as described above.

The control circuit 582 is operative upon receiving an output signal from either of the coin head low sensors 578 associated with tracks 484 and 486 to develop a suitable output signal to which the press control circuit 586 responds and causes the press operation to stop, in the manner as described above.

*Description of operation*

Referring now to FIGURE 19, there is shown a graphical illustration of the press cycle of press 12 compared with the stroke cycle of the feed mechanism according to the present invention. Beginning at 0° and proceeding to 360° of the press cycle, it will be noted that at 0° the upper dies 308 and **308*a* are in their fully retracted position, as is illustrated by the solid lines in FIGURE 3. Also, the slide fingers 146 and 148 are in their fully extended or ejection positions, having each previously ejected a coin 354 from die block 250, as shown in FIGURE 9. Further, coin blanks 350 at the bottom of feed tubes 368 and 369 rest on slide fingers 146 and 148. Another coin blank 350 rests in the rearward end of recess 360 of each slide finger 146 and 148. Also, another coin blank 350 is resiliently held in place on the die face of each of the lower dies 256 and 256*a* by the injection fingers 428 and 430 mounted on each of the slide fingers 146 and 148**.

As the upper dies 308 and **308*a* move downward from 0° to 40° in the press cycle the slide fingers 146 and 148 will rest, or dwell in the position as shown in FIGURE 9, until the stud (FIGURES 5 and 6) extending vertically upward from cross bar 88 travels the distance C in the lost motion device 114 from the end of adjustment screw 160 until it engages block member 130. The distance C corresponds with 40° of the press cycle. During the period in which stud 94 travels the distance C, pawls 448 of injection fingers 428 and 430 associated with each of the slide fingers 146 and 148 serve to resiliently inject a coin blank 350 into the die cavity areas 356 in each of the die cavities 320 and 320*a* and positively position the blanks to lie flat on the die faces 318 of lower dies 256 and 256*a***, respectively.

During the press cycle from 40° to 180° the upper dies 308 and **308*a* descend toward the lower dies 256 and 256*a* and from 140° through 180° perform a coining or squeezing operation upon the coin blanks 350 located on the die faces of lower dies 254 and 254*a*. During this period, i.e., from 40° to 180° of the press cycle, the slide fingers 146 and 148 retract from their fully extended positions, as shown in FIGURE 9, to their fully retracted position, as shown in FIGURE 7. As the slide fingers 146 and 148 retract, the coin blanks 350 located at position B with respect to the feed bed 98 are pulled back or retracted to a transfer station D where the coin blanks 350 are prevented from further displacement toward the right, as viewed in FIGURE 9, by the ends of legs 392 and 394 of stop fingers 390. Thus, the coin blanks are maintained stationary at the transfer station D and the slide fingers 146 and 148 continue to retract toward their fully retracted positions. It will be observed from the graph shown in FIGURE 19 that the ends of the ejection portions 346 of slide fingers 146 and 148 are directly over the center line of the lower dies 256 and 256*a* at approximately 83° in the press cycle. As the slide fingers 146 and 148 continue to be displaced toward their fully retracted positions, the cams 440 of injection fingers 428 and 430 cam against the upwardly tapered surface 456 of hold down housing 338 associated with each slide finger whereby the injection fingers 428 and 430 pivot about pivot post 436 and 438 and upon complete retraction of the slide fingers 146 and 148** take the position shown by the dotted lines in FIGURE 7.

During the period from 180° to 220° of the press cycle the upper dies 308 and **308*a* remain in their coining position, as shown in FIGURE 11, i.e., the total period of coining operation extends from 140° to 220°. During this period of the cycle, i.e., from 180° to 220°, the slide fingers 146 and 148 remain at rest or dwell until the stud 94 received in the lost motion device 114 (see FIGURES 5 and 6) is displaced a distance C from the position shown by the solid lines to the position shown by the dotted lines in FIGURE 5, where it engages the end of adjustment screw 160. The period of the press cycle for stud 140 to be displaced a distance C is equal to 40°. During this dwell period, a coin blank 350 is received by the rearward end of recess 360, i.e., adjacent the arcuate shoulder 362, in each of the slide fingers 146 and 148. In addition, a coin blank 350 is positioned at the transfer station D associated with each of the slide fingers 146 and 148, and is received by coin blank receiving apertures 364 in the respective slide fingers 146 and 148. Coin hold down shoes 372 resiliently hold the blanks in place in the apertures 364**.

During the period from 220° to 360° of the press cycle, the upper dies 308 and **308*a* are displaced vertically upward to their fully retracted position, as shown in FIGURE 3. During the period from 245° to 255° the slide fingers 146 and 148 have preferably moved toward their fully extended positions to the extent that arcuate shoulders 462 at the rearward ends of the coin receiving recesses 360 in the fingers have positioned the coin blanks 350 directly over the no coin sensors 458. Each sensor 458 develops an output signal indicative that a coin blank has been detected during this period, closing the gap in the no coin output signal of the limit switch mechanism 584 and the press will continue to operate. However, if a coin blank was not detected by either of the sensors 458 then the gap in the no coin output signal of limit switch mechanism 584, as represented in FIGURE 22, will remain. In such as case the press control circuit 586** is operative to stop further press operation.

At approximately 238° in the press cycle, a dog 222 begins to ride up the inclined portion 208 of cam surface 188 of cam block 178 in the lower die lift up mechanism 76 (see FIGURE 12). As dog 222 rides up inclined surface 208, lift up shaft 214 is vertically displaced upward through passage 216 pushing lift up plate 236 against lower die lift up studs 240 and **240*a*. The lower die lift up studs 240 and 240*a* in turn serve to vertically lift lower dies 256 and 256*a* via identical adjustable wedge mechanisms 258**, as illustrated in FIGURE 11.

From approximately 292° to 297° in the press cycle dog 222 is in engagement with the flat or dwell surface 210 of cam block 178. During this period the lower dies 256 and **256*a* are elevated so that their respective die faces are substantially in the same plane as the upper flat surface 300 of die block 250. Also, during this period the ejection portions 346 of slide fingers 146 and 148 engage the finished coins 354 (previously blanks 350) on the now raised lower dies 256 and 256*a* and push the coins toward the left end of die block 250**, as viewed in FIGURE 9.

The profile of the cam surface 188 of cam block 178 is superimposed on the graphical illustration of the stroke cycle of the feeding mechanism, shown in FIGURE 19. By adjusting microadjustment 71, FIGURE 3, the pivotal relationship of link 67 with respect to support 62 may be adjusted. In this manner, the point in the press cycle at which dog 222 begins to ride up the inclined surface 208 of cam block 178 may be varied from the 238° point as described above. Similarly, microadjustment 69 may be adjusted to vary the pivotal relationship of link 66 with respect to support 62. In this manner, the point in the press cycle at which the ejection portion 346 of the slide fingers 146 and 148 engage the coins 354 on up lifted lower dies 256 and **256*a* may be varied as desired from the 292° point described above. In practice, both microadjustment 69 and 71 may need to be adjusted if either adjustment is to be changed so as to correlate the movements of the slide finger mechanism 70 with the lower die lift up mechanism 76** in timed relationship to the press cycle.

During the period from approximately 350° to just under 360° of the press cycle, the coins 354 are ejected from the left end of die block 250 by virtue of the velocity imparted to the coins by the ejection portions 346 of slide fingers 146 and 148. During this period the presence of coins being ejected from the left end of die block 250 is sensed by ejection sensors 464, which develop output signals in accordance therewith. The output signals are passed to the control circuit 582 and the press control circuit 586, closing the gap in the ejection output signal of the cam limit switch mechanism (see FIGURE 22) and the press will continue to operate. If either of the coins 354 is not properly ejected, the associated sensor 464 will not develop an output signal indicative of a properly ejected coin. As a result, the gap in the ejection output signal of limit switch mechanism 584 will remain. The press control circuit 586 will be responsive to the gap in the output signal to shut down the press.

During the press operation the hopper motor 474 will be continuously energized to rotate hopper 470 about its axis of rotation A—A, as viewed in FIGURE 14. In this manner, coin blanks 350 contained within hopper 470 will continuously be fed into the tracks 484 and 486 and thence downwardly on the tracks through gauge blocks 516 and 518 and drop through coin blank dispensing apertures 568 and 570 in the tracks and thence into feed tubes 369 and 368, respectively. As the coin blanks 354 drop under the forces of gravity through the feed tubes 368 and 369 a level or head of coin blanks is established in each tube. If the head of coin blanks in either of the tubes 368 or 369 is at the level or higher than the coin head high sensors 576 associated with the tubes, then the sensor will develop an output signal indicative thereof. The control circuit 580 responds to output signals developed by the sensors 576 which are also associated with the tracks 484 and 486 and develops control signals for energizing the associated solenoid gates 508 and 510, thereby preventing additional coin blanks entering the particular feed tube and minimizing jamming. Thus, for example, if the sensor 576 associated with coin feed tube 368 detects the presence of a coin blank head equal to the level of the sensor 576, an output signal indicative thereof will be fed to the control circuit 580. The control circuit 580 will in turn develop an output signal to energize solenoid gate 510, also associated with track 486, to thereby extend plunger 514 into the track 486 and engage track floor 485, preventing additional coin blanks from flowing through the track to the feed tube 368. Suitable time delay means (not shown) is provided, such as in the control circuit 580, to deenergize the gates 508 and 510 after a predetermined time during which the coin head is allowed to decrease as desired so as to prevent hunting, i.e., alternately energizing and deenergizing the solenoid gates at a rapid rate in accordance with one coin blank above or one coin blank below the level of sensors 576. If the coin head high sensors 576 associated with both of the tracks 484 and 486 develop output signals indicative that the head or level of coin blanks in both of the coin feed tubes 368 and 369 are equal or greater than that of the height of the sensors then the control circuit 580 will be operative to develop a control signal to deenergize the feed hopper motor 474, preventing additional coins from flowing into either track 484 or 486 from the hopper 470. Suitable time delay means (not shown) are provided within the control circuit 580 to energize the feed hopper motor 474 after a predetermined time during which the coin blank head in the tubes 368 and 369 decreases to a more desirable level. If only one slide finger and one feed track are used, the other set being idle, there is no need to use either of the solenoid gates 508 and 510, as deenergizing of the hopper motor 474 will suffice to prevent an excessive coin blank head in the feed tube being used.

Coin head low sensors 578 associated with tracks 484 and 486 serve as an added safety feature for stopping the press in the event that coin blanks are not being fed to the feed mechanism 70, i.e., to the slide feed fingers 146 and 148. Thus, for example, if the level or head of coin blanks in feed tube 368 is at a level below that of sensor 578, the sensor will be operative to develop an output signal indicative thereof. The control circuit 582 responds to the output signal and develops a suitable control signal in response to which the press control circuit 586 operates to stop press operation.

The present invention has been described in connection with a particular structural embodiment which has proven satisfactory; however, it is appreciated that the structural embodiment may be modified without departing from the intended spirit and scope of the invention as defined in the appended claims.

What is claimed is:

1. An improved feed mechanism for a press having first and second coaxially aligned dies and a prime mover for imparting reciprocal coaxial movement to the first die relative to the second die in repeating press cycles with each cycle including die working and die retracted positions of said first die, said feed mechanism comprising a slide finger mechanism adapted to be slidably mounted on said press for reciprocal movement along a path transversely of and including the axis defined by said coaxially aligned dies, and power takeoff means connecting said prime mover and said slide finger mechanism in such a relationship for imparting reciprocal movement to said slide finger mechanism along said transverse path between extended and retracted positions respectively corresponding with the retracted and working positions of said first die, said slide finger mechanism including workpiece receiving and dispensing means for receiving a workpiece when in said retracted position and dispensing said workpiece on said second die when in said extended position, the improvement comprising:

workpiece sensing means for sensing whether a workpiece is received by said receiving and dispensing means and operative to develop output signals in accordance therewith, and press control circuit means responsive to said output signals for stopping press operation upon the absence of a said workpiece in said receiving and dispensing means.

2. An improved feed mechanism for a press having first and second coaxially aligned dies and a prime mover for imparting reciprocal coaxial movement to the first die relative to the second die in repeating press cycles with each cycle including die working and die retracted positions of said first die, said feed mechanism comprising a slide finger mechanism adapted to be slidably mounted on said press for reciprocal movement along a path transversely of and including the axis defined by said coaxially aligned dies, and power takeoff means connecting said prime mover and said slide finger mechanism in such a relationship for imparting reciprocal movement to said slide finger mechanism along said transverse path between extended and retracted positions respectively corresponding with the retracted and working positions of said first die, said slide finger mechanism including workpiece receiving and dispensing means for receiving a workpiece when in said retracted position and dispensing said workpiece on said second die when in said extended position, the improvement comprising:

workpiece head maintaining means for maintaining a head of workpieces to be fed to said workpiece receiving and dispensing means.

3. A feed mechanism for a press as claimed in claim 2, including workpiece maximum head sensor means for sensing whether said head of workpieces is equal to a predetermined maximum value and operative to develop output signals in accordance therewith, and workpiece head controlling means responsive to said output signals for preventing any increase in said head of workpieces when said sensor senses that said head of workpieces is equal to said predetermined maximum value.

4. A feed mechanism for a press as claimed in claim 2, including workpiece minimum head sensor means for sensing whether said head of workpieces is less than a predetermined minimum value and operative to develop output signals in accordance therewith, and press control means responsive to said output signals for stopping press operation when said sensor means senses that said head of workpieces is less than said predetermined minimum value.

5. A feed mechanism for a press as claimed in claim 2 further comprising a second die displacement means including manually adjustable means for adjusting the extent said second die displacement means displaces said second die coaxially toward said first die.

6. A feed mechanism for a press as claimed in claim 2 further comprising a second die displacement means including manually operated means for applying forces to said second die for displacing said second die toward said first die indepenently of the action of said power takeoff means.

7. A feed mechanism for a press as claimed in claim 2 wherein said workpiece receiving and dispensing means includes a longitudinally extending workpiece receiving recess in the upper surface of said slide finger mechanism.

8. A feed mechanism for a press as claimed in claim 7 including workpiece hold down means for resiliently maintaining workpieces received by said recess in said slide finger mechanism in place on the floor of said recess while said slide finger mechanism traverses the path from said retracted position to said extended position.

9. A feed mechanism for a press as claimed in claim 8 including manually adjustable means for adjusting the resilient force exerted by said hold down means on said workpieces received by said recess in said slide finger mechanism.

10. A feeding mechanism for feeding coin blanks to a coining press and ejecting finished coins therefrom, said press including first and second coaxially aligned dies and a prime mover for imparting reciprocal coaxial movement to said first die relative to said second die in repeating press cycles with each cycle including die coining and die retracted positions of said first die, the improvement in coin blank feeding mechanism comprising: a slide finger mechanism adapted to be slidably mounted on said press for reciprocal movement along a path transversely of and including the axis defined by said coaxially aligned dies, power takeoff means connecting said prime mover and said slide finger mechanism in such a relationship for imparting reciprocal movement to said slide finger mechanism along said transverse path between extended and retracted positions respectively corresponding with the retracted and coining positions of said first die, said slide finger mechanism including coin blank receiving and dispensing means for receiving a coin blank when in said retracted position and dispensing said coin blank on said second die when in said extended position, a coin blank feed tube adapted to be mounted on said press relative to said slide finger mechanism to contain a head of coin blanks and feed coin blanks to said coin blank receiving and dispensing means when said slide finger mechanism is in its retracted position, a rotatable coin blank hopper for receiving and rotating coin blanks therein, a coin blank track connecting said hopper with said feed tube for conveying coin blanks in said hopper to said feed tube when said hopper is rotating, sensing means responsive to the head of coin blanks contained by said feed tube and operative to develop output signals in accordance therewith, and hopper rotation control means responsive to said output signals to prevent hopper rotation when said head of coin blanks is equal to a predetermined value, whereby coin blanks in said hopper are prevented from being conveyed by said track to increase the head of coin blanks in said feed tube.

11. A feed mechanism as claimed in claim 10 wherein said coin blank track includes coin blank gauging and blocking means for blocking passage of coin blanks to said feed tube which are of a thickness and/or diameter greater than a predetermined thickness and/or diameter.

12. A feed mechanism as claimed in claim 11 wherein said coin blank gauging and blocking means includes a circular slot located with respect to the path of movement of said coin blanks that each said coin blank will pass over said slot whereby coin blanks of a diameter less than that of said slot will fall through said slot and thereby be prevented from being conveyed to said feed tube.

13. An improved feed mechanism for a press having first and second coaxially aligned dies and a prime mover for imparting reciprocal coaxial movement to the first die relative to the second die in repeating press cycles with each cycle including die working and die retracted positions of said first die, said feed mechanism comprising a slide finger mechanism adapted to be slidably mounted on said press for reciprocal movement along a path transversely of and including the axis defined by said coaxially aligned dies, and power takeoff means connecting said prime mover and said slide finger mechanism in such a relationship for imparting reciprocal movement to said slide finger mechanism along said transverse path between extended and retracted positions respectively corresponding with the retracted and working positions of said first die, said slide finger mechanism including a workpiece receiving and dispensing means for receiving a workpiece when in said retracted position and dispensing said workpiece on said second die when in said extended position, said slide finger mechanism including workpiece ejection means for ejecting a workpiece from said second die as said slide finger mechanism is displaced from its retracted position to its extended position, the improvement comprising:

workpiece sensing means for sensing whether said workpiece has been ejected from said second die when said finger mechanism is displaced to its extended position and operative to develop output signals in accordance therewith, and press control circuit means responsive to said output signals for stopping press operation when said workpiece has not been ejected.

References Cited by the Examiner

UNITED STATES PATENTS

| | | | |
|---|---|---|---|
| 1,106,571 | 8/1914 | Lewis | 72—427 |
| 1,981,490 | 11/1934 | Witte | 72—424 |
| 2,385,521 | 9/1945 | Mead | 221—238 |
| 2,802,381 | 8/1957 | Leasia | 72—427 |
| 3,144,168 | 8/1964 | Campbell | 221—238 |

FOREIGN PATENTS

| | | |
|---|---|---|
| 545,590 | 3/1932 | Germany. |

CHARLES W. LANHAM, *Primary Examiner.*

G. P. CROSBY, *Assistant Examiner.*